(12) United States Patent
Kathirasen et al.

(10) Patent No.: US 12,318,044 B2
(45) Date of Patent: Jun. 3, 2025

(54) AUTOMATED FOOD MAKING APPARATUS

(71) Applicant: DoorDash, Inc., San Francisco, CA (US)

(72) Inventors: Kathirgugan Kathirasen, Selangor (MY); Deepak C. Sekar, San Jose, CA (US); Brian Richardson, Los Gatos, CA (US); Sanath Bhat, Redwood City, CA (US); Victoria Reidling, San Jose, CA (US)

(73) Assignee: DoorDash, Inc., San Francisco, CA (US)

( * ) Notice: Subject to any disclaimer, the term of this patent is extended or adjusted under 35 U.S.C. 154(b) by 0 days.

(21) Appl. No.: 18/395,355

(22) Filed: Dec. 22, 2023

(65) Prior Publication Data

US 2024/0138629 A1    May 2, 2024

Related U.S. Application Data

(60) Division of application No. 16/934,447, filed on Jul. 21, 2020, now Pat. No. 12,082,749, which is a
(Continued)

(51) Int. Cl.
| | |
|---|---|
| *A47J 44/00* | (2006.01) |
| *B25J 9/00* | (2006.01) |
| *B25J 11/00* | (2006.01) |

(52) U.S. Cl.
CPC .............. *A47J 44/00* (2013.01); *B25J 9/0084* (2013.01); *B25J 11/0045* (2013.01); *Y10S 901/16* (2013.01)

(58) Field of Classification Search
CPC ...... A47J 44/00; B25J 9/0084; B25J 11/0045; Y10S 901/16
See application file for complete search history.

(56) References Cited

U.S. PATENT DOCUMENTS

| | | |
|---|---|---|
| 3,277,356 A | 10/1966 | Kraft et al. |
| 4,058,120 A | 11/1977 | Caparrelli et al. |
| | (Continued) | |

FOREIGN PATENT DOCUMENTS

| | | |
|---|---|---|
| CA | 2555644 C | 9/2005 |
| CN | 1179384 A | 4/1998 |
| | (Continued) | |

OTHER PUBLICATIONS

Notification of the Transmittal of the International Search Report and the Written Opinion of the International Searching Authority in PCT International Application No. PCT/US2015/049003, dated Dec. 4, 2015. [Cited in Parent].

(Continued)

*Primary Examiner* — Thien S Tran
(74) *Attorney, Agent, or Firm* — Michele V. Frank; Venable LLP

(57) ABSTRACT

An automated food making apparatus is described. An automated food making apparatus can include: a carousel; a dispensing apparatus shared among a plurality of canisters on the carousel, wherein at least one canister includes a paddle; and wherein the dispensing apparatus is configured to rotate the canister's paddle to dispense ingredients stored in the canister. A dispensing mechanism for an automated food making apparatus can include: an actuator arm; a motor that is adapted to rotate the actuator arm; one or more magnets embedded in the actuator arm; and one or more sensors configured to detect position of the actuator arm; wherein the actuator arm dispenses ingredients by rotating a pin located on a canister.

17 Claims, 28 Drawing Sheets

Related U.S. Application Data continuation of application No. 15/449,548, filed on Mar. 3, 2017, now Pat. No. 10,813,503, which is a continuation-in-part of application No. 14/847,959, filed on Sep. 8, 2015, now abandoned.

(60) Provisional application No. 62/304,277, filed on Mar. 6, 2016, provisional application No. 62/201,105, filed on Aug. 4, 2015, provisional application No. 62/185,524, filed on Jun. 26, 2015, provisional application No. 62/150,303, filed on Apr. 21, 2015, provisional application No. 62/094,595, filed on Dec. 19, 2014, provisional application No. 62/056,368, filed on Sep. 26, 2014, provisional application No. 62/047,785, filed on Sep. 9, 2014.

(56) References Cited

U.S. PATENT DOCUMENTS

| | | | |
|---|---|---|---|
| 4,335,761 A * | 6/1982 | Peronek | B67C 3/26 141/371 |
| 4,503,502 A | 3/1985 | Chapin | |
| 4,715,517 A | 12/1987 | Potter et al. | |
| 4,748,902 A | 6/1988 | Maurantonio | |
| 4,751,878 A | 6/1988 | Lopes | |
| 4,875,607 A | 10/1989 | Torita et al. | |
| 5,955,118 A | 9/1999 | Powell | |
| 6,029,828 A | 2/2000 | Robbins et al. | |
| 6,131,766 A | 10/2000 | King et al. | |
| 6,332,100 B1 | 12/2001 | Sahai et al. | |
| 6,533,105 B1 | 3/2003 | Dutschke | |
| 6,725,889 B2 | 4/2004 | Perez Vales | |
| 7,174,830 B1 | 2/2007 | Dong | |
| 7,267,833 B2 | 9/2007 | Shon et al. | |
| 7,278,553 B2 | 10/2007 | Py et al. | |
| 9,820,615 B2 | 11/2017 | Jin et al. | |
| 10,064,521 B1 * | 9/2018 | Gawali | B65D 83/00 |
| 11,284,748 B2 | 3/2022 | Sekar et al. | |
| 2002/0139811 A1 | 10/2002 | Tramontina et al. | |
| 2003/0234264 A1 | 12/2003 | Landau | |
| 2004/0129740 A1 | 7/2004 | Barker et al. | |
| 2004/0159244 A1 | 8/2004 | Leason | |
| 2005/0193901 A1 | 9/2005 | Buehler | |
| 2005/0194403 A1 | 9/2005 | Mink et al. | |
| 2006/0011141 A1 | 1/2006 | Bird et al. | |
| 2007/0068969 A1 | 3/2007 | Orzech et al. | |
| 2007/0084520 A1 | 4/2007 | Driessen et al. | |
| 2007/0119688 A1 | 5/2007 | Brandt | |
| 2008/0128455 A1 | 6/2008 | Estruch | |
| 2008/0282904 A1 | 11/2008 | Liu | |
| 2009/0277516 A1 | 11/2009 | Winkler et al. | |
| 2009/0297678 A1 | 12/2009 | Liu | |
| 2010/0095895 A1 | 4/2010 | Laliberta | |
| 2010/0108717 A1 | 5/2010 | Szymanski | |
| 2010/0126285 A1 | 5/2010 | Caroll | |
| 2010/0276442 A1 | 11/2010 | Querfurth et al. | |
| 2011/0027914 A1 | 2/2011 | Bunce et al. | |
| 2011/0108546 A1 | 5/2011 | Cho et al. | |
| 2012/0288973 A1 | 11/2012 | Matsunaga | |
| 2013/0112683 A1 | 5/2013 | Hegedis et al. | |
| 2013/0192527 A1 | 8/2013 | Reid | |
| 2014/0131384 A1 | 5/2014 | Martinez | |
| 2014/0230660 A1 | 8/2014 | He | |
| 2014/0374519 A1 | 12/2014 | Davis et al. | |
| 2015/0053097 A1 | 2/2015 | Vardakostas et al. | |
| 2015/0075391 A1 | 3/2015 | Vardakostas et al. | |
| 2015/0129611 A1 | 5/2015 | Vulpitta et al. | |
| 2015/0164131 A1 | 6/2015 | Vardakostas et al. | |
| 2015/0208871 A1 | 7/2015 | Chang | |
| 2015/0321893 A1 | 11/2015 | Corbelli et al. | |
| 2016/0067866 A1 | 3/2016 | Sekar et al. | |
| 2017/0015541 A1 | 1/2017 | Vulpitta et al. | |
| 2017/0158479 A1 * | 6/2017 | Comin | B67C 3/26 |
| 2017/0172351 A1 | 6/2017 | Kathirasen et al. | |
| 2017/0189930 A1 | 7/2017 | Turner et al. | |
| 2017/0290345 A1 | 10/2017 | Garden et al. | |
| 2021/0000300 A1 | 1/2021 | Sekar et al. | |
| 2021/0000301 A1 | 1/2021 | Kathirasen et al. | |
| 2021/0321826 A1 | 10/2021 | Bhat et al. | |
| 2021/0345833 A1 | 11/2021 | Sekar et al. | |

FOREIGN PATENT DOCUMENTS

| | | |
|---|---|---|
| CN | 1250356 A | 4/2000 |
| CN | 1413340 A | 4/2003 |
| CN | 1678194 A | 10/2005 |
| CN | 1739477 A | 3/2006 |
| CN | 2812591 Y | 9/2006 |
| CN | 101284639 A | 10/2008 |
| CN | 102164504 A | 8/2011 |
| CN | 104310298 A | 1/2015 |
| CN | 104427918 A | 3/2015 |
| CN | 204625150 U | 9/2015 |
| EP | 0455477 A2 | 11/1991 |
| EP | 1191865 B1 | 9/2003 |
| EP | 2413749 B1 | 8/2013 |
| GB | 588616 A | 5/1947 |
| JP | 4136297 B2 | 8/2008 |
| JP | 2009-508775 A | 3/2009 |
| JP | 2009-161204 A | 7/2009 |
| RU | 2002119575 A | 2/2004 |
| WO | 98/36668 A2 | 8/1998 |
| WO | 9953808 A2 | 10/1999 |
| WO | 2006053507 A1 | 5/2006 |
| WO | 2007/039347 A2 | 4/2007 |
| WO | 2011060337 A2 | 5/2011 |
| WO | 2014086816 A1 | 6/2014 |
| WO | 2015161713 A1 | 10/2015 |
| WO | 2016029294 A1 | 3/2016 |
| WO | 2016040361 A1 | 3/2016 |

OTHER PUBLICATIONS

Price, Foodini is a 3D printer for everything from burgers to gnocchi, Engadget, Mar. 27, 2014, available at http://www.engadget.com/2014/03/27/foodini/. [Cited in Parent].

Rigg, Cooki's the robot chef that only knows how to stir, Engadget, Jan. 8, 2015, available at http://www.engadget.com/2015/01/08/cooki-robot-chef/. [Cited in Parent].

Cheshire, Say hello to EveryCook, your robotic chef, Wired, Mar. 2014, available at http://www.wired.co.uk/magazine/archive/2014/03/start/computerised-cuisinier. [Cited in Parent].

International Search Report issued Sep. 1, 2017 in International Patent Application No. PCT/US2017/020785. [Cited in Parent].

Written Opinion issued Sep. 1, 2017 in International Patent Application No. PCT/US2017/020785. [Cited in Parent].

WebstaurantStore Dry Food Dispenser—Triple Canister, Nov. 18, 2015, retrieved Jul. 14, 2017 from http://web.archive.org/web/20151118013427/http://www.webstaurantstore.com/dry-food-dispenser-triple-canister/407CRD3.html. [Cited in Parent].

Extended European Search Report issued Aug. 3, 2018 in European Patent Application No. 15840037.4 [Cited in Parent].

International Search Report and Written Opinion in related International Patent Application PCT/US2018/026065 issued Sep. 18, 2018 [Cited in Parent].

Office Action issued in related U.S. Appl. No. 15/449,548 dated Sep. 16, 2019 [Available in IFW].

International Search Report and Written Opinion issued in related International Patent Applciation PCT/US2015/049003 dated Dec. 4, 2015 [Cited in Parent].

Office Action issued in related U.S. Appl. No. 15/449,548 dated May 21, 2020 [Avaiable in IFW].

Notice of Allowance issued in related U.S. Appl. No. 15/449,548 dated Jun. 17, 2020 [Available in IFW].

Non-Final Office Action dated Sep. 21, 2020, directed to U.S. Appl. No. 15/945,483; 11 pages [Available in IFW].

Office Action mailed Feb. 2, 2021, in corresponding CN Application No. 201880028412.2 [Cited in Parent].

Notice of Allowance and Fee(s) Due dated Apr. 21, 2021, directed to U.S. Appl. No. 15/945,483; 11 pages [Available in IFW].

(56) References Cited

OTHER PUBLICATIONS

First Examination Report dated Jun. 15, 2021, directed to related Indian Application No. 201917039732; 6 pages [Cited in Parent].

Extended European Search Report dated Jul. 14, 2021, directed to EP Application No. 18761194.2; 6 pages [Cited in Parent].

Office Action and Search Report directed to Russian Application No. 2019130974, dated Aug. 6, 2021; 15 pages [Cited in Parent].

Corrected Notice of Allowability dated Sep. 10, 2021, directed to U.S. Appl. No. 15/945,483; 3 pages [Available in IFW].

Corrected Notice of Allowability dated Sep. 30, 2021, directed to U.S. Appl. No. 15/945,483; 3 pages [Available in IFW].

Notification of the Second Action dated Oct. 26, 2021, directed to Chinese Application No. 201880028412.2; 10 pages [Cited in Parent].

Notice of Allowance and Fee(s) Due dated Nov. 24, 2021, directed to U.S. Appl. No. 15/945,483; 11 pages [Available in IFW].

Notice of Reasons for Rejection mailed Jan. 18, 2022, directed to JP Application No. 2019-569666; 17 pages [Cited in Parent].

Notification of Grant Patent Right for Invention dated Jan. 25, 2022, directed to related Chinese Application No. 201880028412.2; 6 pages [Cited in Parent].

Official Action dated Apr. 7, 2022, directed to RU Application No. 2019130974; 15 pages [Cited in Parent].

Non-Final Office Action dated Apr. 27, 2022, directed to U.S. Appl. No. 16/933,130; 13 pages [Available in IFW].

Notice of Reasons for Rejection mailed Aug. 22, 2022, directed to JP Application No. 2019-569666; 6 pages [Cited in Parent].

Notice of Allowance and Fee(s) Due dated Sep. 21, 2022, directed to U.S. Appl. No. 16/933,130; 8 pages [Available in IFW].

Corrected Notice of Allowability dated Nov. 16, 2022, directed to U.S. Appl. No. 16/933,130; 2 pages [Available in IFW].

Non-Final Office Action dated Dec. 6, 2022, directed to U.S. Appl. No. 17/382,907; 13 pages [Available in IFW].

Decision to Grant a Patent dated Jan. 6, 2023, directed to JP Application No. 2019-569666; 6 pages [Cited in Parent].

Notice of Allowance and Fee(s) Due dated Feb. 1, 2023, directed to U.S. Appl. No. 16/933,130; 8 pages [Available in IFW].

Office Action mailed Feb. 28, 2023, directed to MX Application No. MX/a/2019/010528; 5 pages [Cited in Parent].

Final Office Action dated Mar. 17, 2023, directed to U.S. Appl. No. 17/382,907; 12 pages [Available in IFW].

Non-Final Office Action mailed Mar. 20, 2023, directed to U.S. Appl. No. 16/933,130; 14 pages [Available in IFW].

Non-Final Office Action mailed Apr. 20, 2023, directed to U.S. Appl. No. 17/359,191; 15 pages [Available in IFW].

Non-Final Office Action dated Jul. 24, 2023, directed to U.S. Appl. No. 17/382,907; 11 pages [Available in IFW].

Final Office Action dated Aug. 4, 2023, directed to U.S. Appl. No. 17/382,907; 13 pages [Available in IFW].

Notice of Allowance dated Oct. 12, 2023, directed to U.S. Appl. No. 17/359,191; 8 pages [Available in IFW].

Notice of Allowance dated Oct. 23, 2023, directed to U.S. Appl. No. 16/933,130; 9 pages [Available in IFW].

Office Action dated Apr. 18, 2024, directed to Canadian Patent Application No. 3,055,291; 3 pages.

Notice of Allowance and Fee(s) Due mailed Jan. 9, 2024, directed to U.S. Appl. No. 17/382,907; 8 pages.

Communication under Rule 71(3) EPC dated Feb. 26, 2024, directed to EP Patent Application No. 18761194.2; 8 pages.

Notification of the First Office Action dated Feb. 29, 2024, directed to CN Patent Application No. 202210366024.3; 18 pages.

Notification of Second Office Action dated Jul. 16, 2024, directed to CN Patent Application No. 202210366024.3; 16 pages.

Notification of Grant of Patent Right dated Oct. 12, 2024, directed to CN Patent Application No. 202210366024.3; 4 pages.

Non-Final Rejection dated Dec. 27, 2024, directed to U.S. Appl. No. 18/444,469; 12 pages.

\* cited by examiner

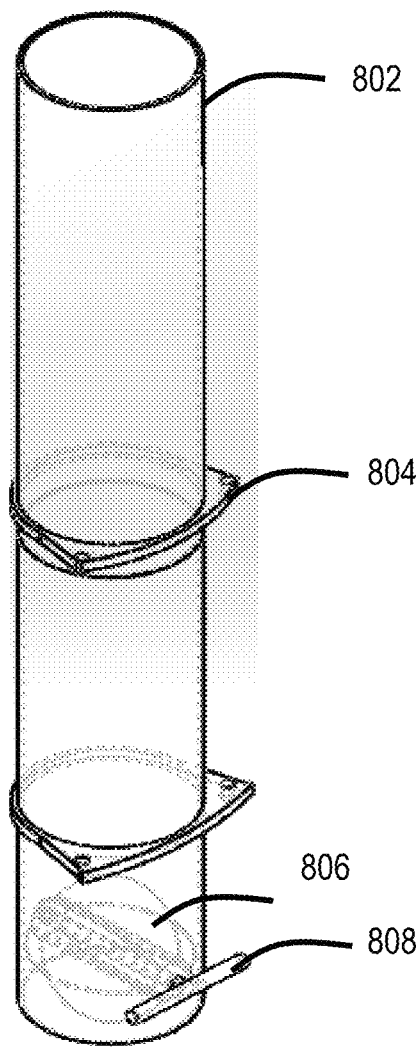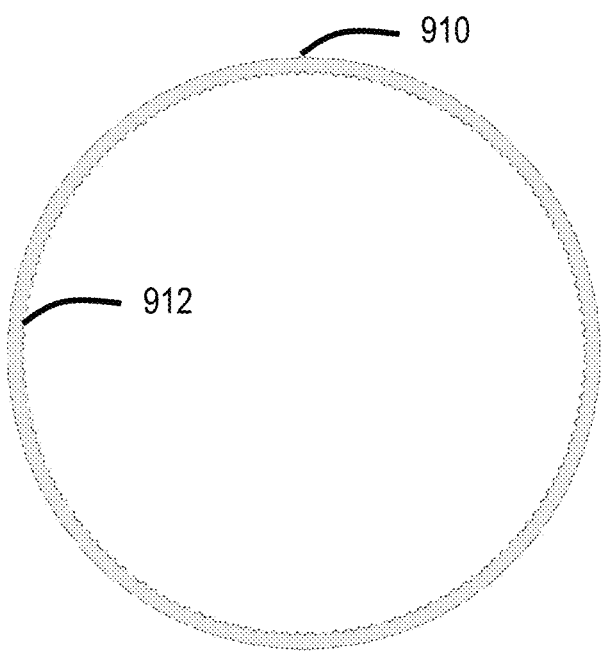
Fig. 8
Fig. 9

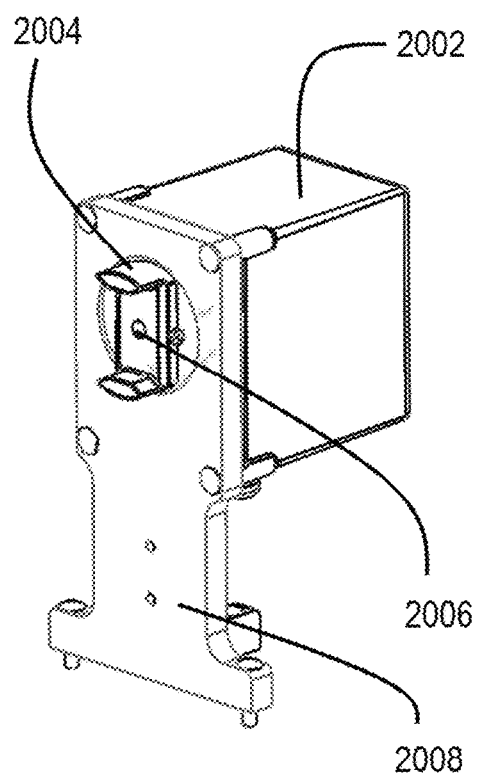
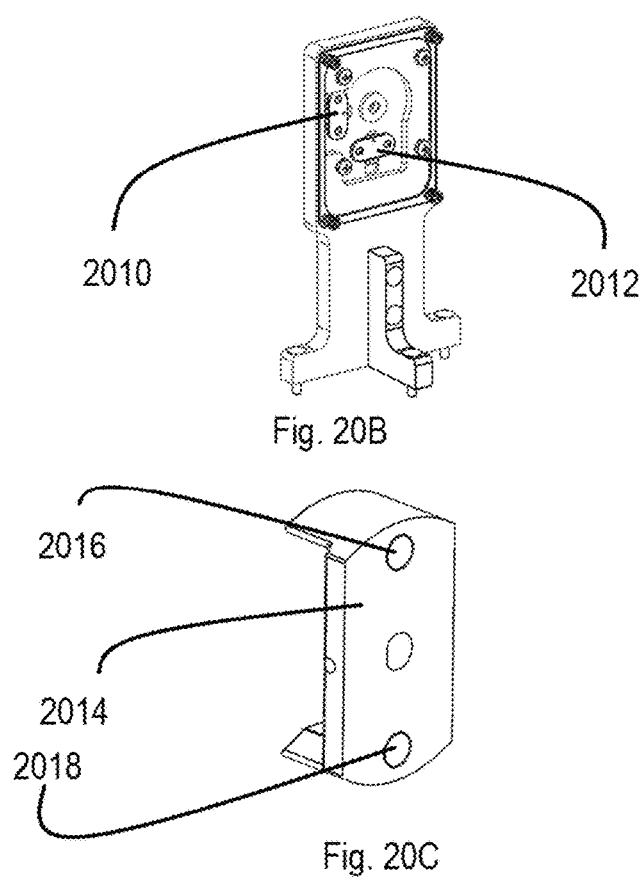
Fig. 20A
Fig. 20B
Fig. 20C

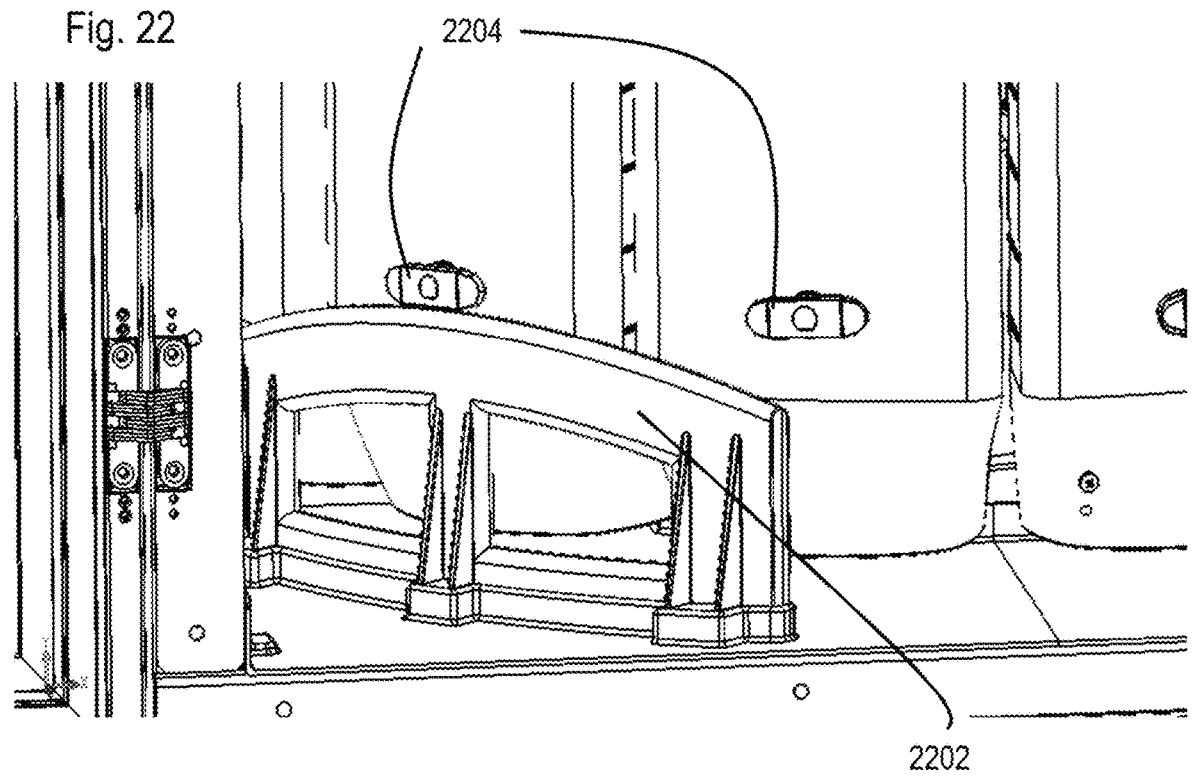

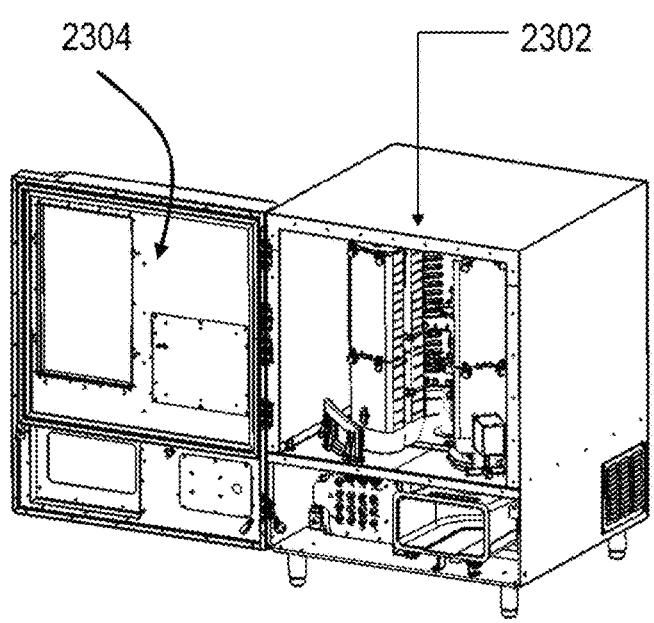 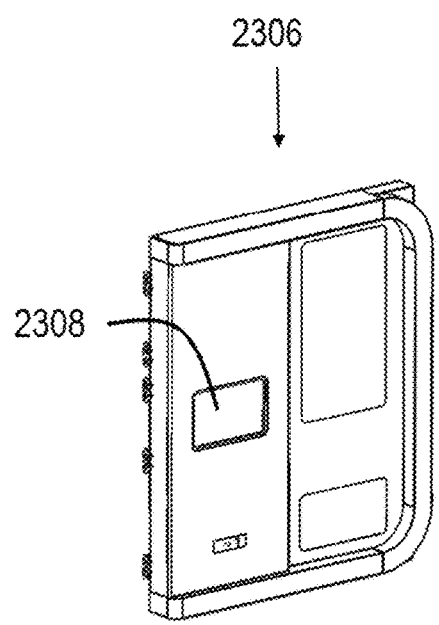
Fig. 23A
Fig. 23B

AUTOMATED FOOD MAKING APPARATUS

CROSS-REFERENCE TO RELATED APPLICATIONS

This application is a divisional of U.S. Non-provisional patent application Ser. No. 16/934,447, filed Jul. 21, 2020, which is a continuation of U.S. Non-provisional patent application Ser. No. 15/449,548 filed Mar. 3, 2017, which claims the benefit of U.S. Provisional Patent Application No. 62/304,277, filed Mar. 6, 2016, and is a continuation in part of U.S. Non-provisional patent application Ser. No. 14/847,959, filed on Sep. 8, 2015, which claims the benefit of U.S. Provisional Patent Application No. 62/047,785, filed Sep. 9, 2014, U.S. Provisional Patent Application No. 62/056,368, filed Sep. 26, 2014, U.S. Provisional Patent Application No. 62/094,595, filed Dec. 19, 2014, U.S. Provisional Patent Application No. 62/150,303, filed Apr. 21, 2015, U.S. Provisional Patent Application No. 62/185,524, filed Jun. 26, 2015, and U.S. Provisional Patent Application No. 62/201,105 filed Aug. 4, 2015. The contents of each of the foregoing applications are incorporated herein by reference.

BACKGROUND OF THE INVENTION

1. Field of the Invention

This application relates to the general field of electronically-aided apparatuses, systems, methods and techniques to conduct the food making process in a home or a business.

2. Discussion of Background Art

Over the years, a number of innovations have come in to help with the cooking process. Food processors are now available to chop vegetables and meat. Induction cooktops allow a faster cooking process. Microwave ovens allow efficient reheating. However, despite these innovations, many of us spend an hour a day, or sometimes even more, cooking food for ourselves and our families. Cooking also requires a significant learning curve before one can do it in a tasty manner. As well, commercial food enterprises, such as restaurants, must currently allocate a significant amount of their costs on the human cooking endeavor. Ways to reduce the "human time" needed for cooking as well as the learning curve associated with cooking could be quite useful. As well, direct and indirect economic benefits may accrue for a business by transferring some of the human time costs to a machine, apparatus, robot, and such.

U.S. Patent Application Publication No. 2013/0112683 from Hegedis, Davenport and Hoare apparently describes a cooking apparatus where a heating element works with a user interface and temperature sensors and provides prompts to the user during cooking. However, this requires user input to provide all the ingredients needed for cooking and requires the user to stand near the cooktop for large periods of time to respond to the prompts provided by the cooking apparatus. There is no mixing function available automatically, so the user needs to stand near the cooktop for large periods of time as well.

U.S. Patent Application Publication No. 2011/0108546 from Cho and Chen apparently describes an intelligent heating mechanism which adaptively provides power to an induction cooktop based on temperature sensor data as well as a user-defined temperature profile. However, this requires the user to provide all the ingredients needed for cooking manually and requires the user to stand near the cooktop to mix the food items periodically.

Foodini, a prototype and soon-to-be-released product from Natural Machines, apparently 3D prints food items by heating food pastes and dispensing them on to a stage. However, this requires food to be in paste form before being dispensed, which could be cumbersome and costly.

Everycook, a prototype made in Europe, apparently promises to cut and mix food items and cook them with a recipe. However, the user still needs to be present near the Everycook cooking apparatus and dump additional food items every so often.

Sereneti Kitchen, a prototype in the US, apparently wants to automate the cooking process but does not conduct any chopping of the ingredients and utilizes pre-chopped food instead. Neither does it put measured quantities of ingredients into the cooking vessel.

What is needed are apparatuses and methods that allow food preparation with minimal human intervention.

SUMMARY

An automated food making apparatus can include: a carousel; a dispensing apparatus shared among a plurality of canisters on the carousel, wherein at least one canister includes a paddle; and wherein the dispensing apparatus is configured to rotate the canister's paddle to dispense ingredients stored in the canister.

A dispensing mechanism for an automated food making apparatus can include: an actuator arm; a motor that is adapted to rotate the actuator arm; one or more magnets embedded in the actuator arm; and one or more sensors configured to detect position of the actuator arm; wherein the actuator arm dispenses ingredients by rotating a pin located on a canister.

An automated food making apparatus can include: a carousel; a dispensing apparatus shared among a plurality of canisters on the carousel; wherein at least one canister is configured to dispense a liquid; and wherein the dispensing apparatus is configured to dispense said canister's contents by rotational motion of the dispensing apparatus.

An automated food making apparatus can include: a carousel; and at least one canister is configured to seal or unseal a food opening, the at least one canister having a base.

Additional features, advantages, and embodiments of the invention are set forth or apparent from consideration of the following detailed description, drawings and claims. Moreover, it is to be understood that both the foregoing summary of the invention and the following detailed description are examples and intended to provide further explanation without limiting the scope of the invention as claimed.

BRIEF DESCRIPTION OF THE DRAWINGS

Various embodiments of the invention will be understood and appreciated more fully from the following detailed description, taken in conjunction with the drawings in which:

FIG. 8 illustrates an embodiment of this invention, which may dispense solid ingredients;

FIG. 9 illustrates an embodiment of this invention, wherein food is prevented from sticking on to the sides of the ingredient container by reducing the surface area of contact between the ingredient container and the food;

FIGS. 20A-20C illustrate an embodiment of this invention, which show how magnets and Hall sensors may be structured for dispensing material from ingredient containers;

FIG. 22 illustrates an embodiment of this invention, that shows how a knob may be straightened with a "knob straightener mechanism";

FIGS. 23A-23B illustrate an embodiment of this invention, that shows how a robot may be controlled using a touchscreen user interface;

DETAILED DESCRIPTION

Embodiments of the present invention are now described with reference to at least the above figures. Persons of ordinary skill in the art will appreciate that the description and figures illustrate rather than limit the invention and that in general the figures are not drawn to scale for clarity of presentation. Such skilled persons will also realize that many more embodiments are possible by applying the inventive principles contained herein and that such embodiments fall within the scope of the invention which is not to be limited except by any appended claims. The term "canister" may be used interchangeably with the term "tube" and the term "container" at various sections of this patent application. The term "pin" may be used interchangeably with the term "knob" at various sections of this patent application.

Figure 1:
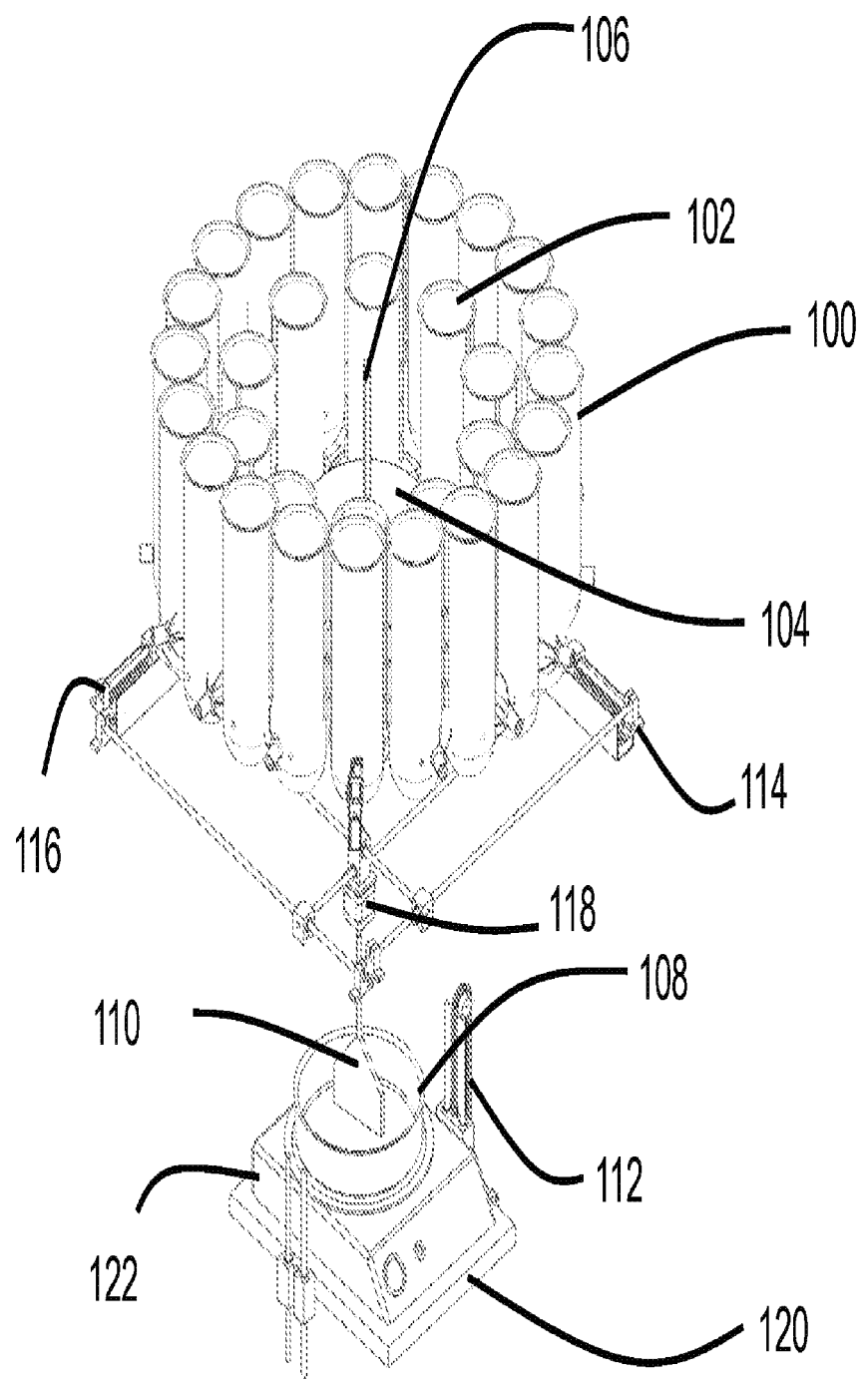
FIG. 1 depicts an embodiment of this present invention, which may include a carousel atop the cooking pot.

FIG. 1 describes an embodiment of this present invention, which may be a robotic cooking apparatus or food preparation machine/apparatus. A robotic cooking apparatus may include outer container 100, inner container 102, carousel 104, shaft 106, pan 108, stirrer 110, robot arm 112, X rail 114, Y rail 116, motor 118, plate 120, and heater 122. Food may be stored in ingredient dispenser containers such as outer container 100 and inner container 102. The terms tube and canister may also be used to refer to containers at various sections of this patent application. Ingredient dispenser containers outer container 100 and inner container 102 may be mounted on to a carousel 104 which may be attached to a rotating shaft 106. The shaft 106 may be rotated with the help of a motor. Several mechanisms may be used for rotating containers placed in a circular configuration, which may be placed on a circular board/platform. In FIG. 1, two circular rows of ingredient dispensers are depicted, with outer container 100 on the outer circular row and inner container 102 on the inner circular row. A number of circular rows may be designed and utilized, and may range from at least 1 to 10. The carousel 104 may be placed atop the pan 108 where cooking may happen. Pan 108 may be called pot, cooking pot, cooking pan, or cooking vessel herein. The carousel 104 may include openings (not shown), including substantially circular and other shapes, for dispensing food from ingredient containers outer container 100 and inner container 102, and other containers. These circular openings may be structured such that when food falls through these circular openings, they fall into the pan 108. A heater, such as, for example, an induction heater 122, may be used to cook a dish. It may include a stirrer 110 which may be moved in X and Y dimensions (with respect to pan 108) using robot mechanisms which may include round shafts or rails such as X rail 114 and Y rail 116. Stirrer 110 may also be designed to move in the Z dimension and various angles/combinations of X, Y and Z. A motor 118 may be used for rotating the stirrer 110. Several variations of these embodiments are possible. For example, the stirrer 110 may be attached to a polar robot mechanism. Polar mechanisms may provide improved resistance to cooking grease related reliability issues since they may be easier to seal. Cooking pan 108 and heater 122 may be moved via moving plate 120 up and down using a robot arm 112. Robot arms shown in FIG. 1 may be built using a number of different mechanisms, such as, for example, chains, belts, lead screws, ball screws and many other materials. A refrigeration system, a Peltier cooling system or other cooling apparatus may be utilized to cool the region above the carousel 104, and efficiency improved by placing components above the carousel 104 in a thermally isolated environment. The opening on the carousel which may allow food to be dispensed into the pan 108 may be open and closed using a robot arm or other actuation mechanism. The plate 120 may include a mass sensor which measures the weight of food in the pan. This may provide information about the status of a certain dispensing step i.e. how much food has been dispensed from ingredient dispensers such as outer container 100 and inner container 102 into the pan 108. The mass sensor may optionally also provide information about status of the cooking process—by measuring how much weight reduction happens during the cooking process. It will be clear to one skilled in the art that several variations of these embodiments may be possible. For example, an induction heater 122 need not be present, and one may dispense ingredients using the robotic cooking apparatus for making salads and other types of food. Sensors (not shown) may be present for estimating if ingredients in containers such as inner container 102 may be spoilt. Carousel 104 may include more than two rows of containers or just one row of containers. The temperature of the environment in which the carousel with containers is placed can be modulated, for example, using a refrigeration system or a heating system.

Figure 2:
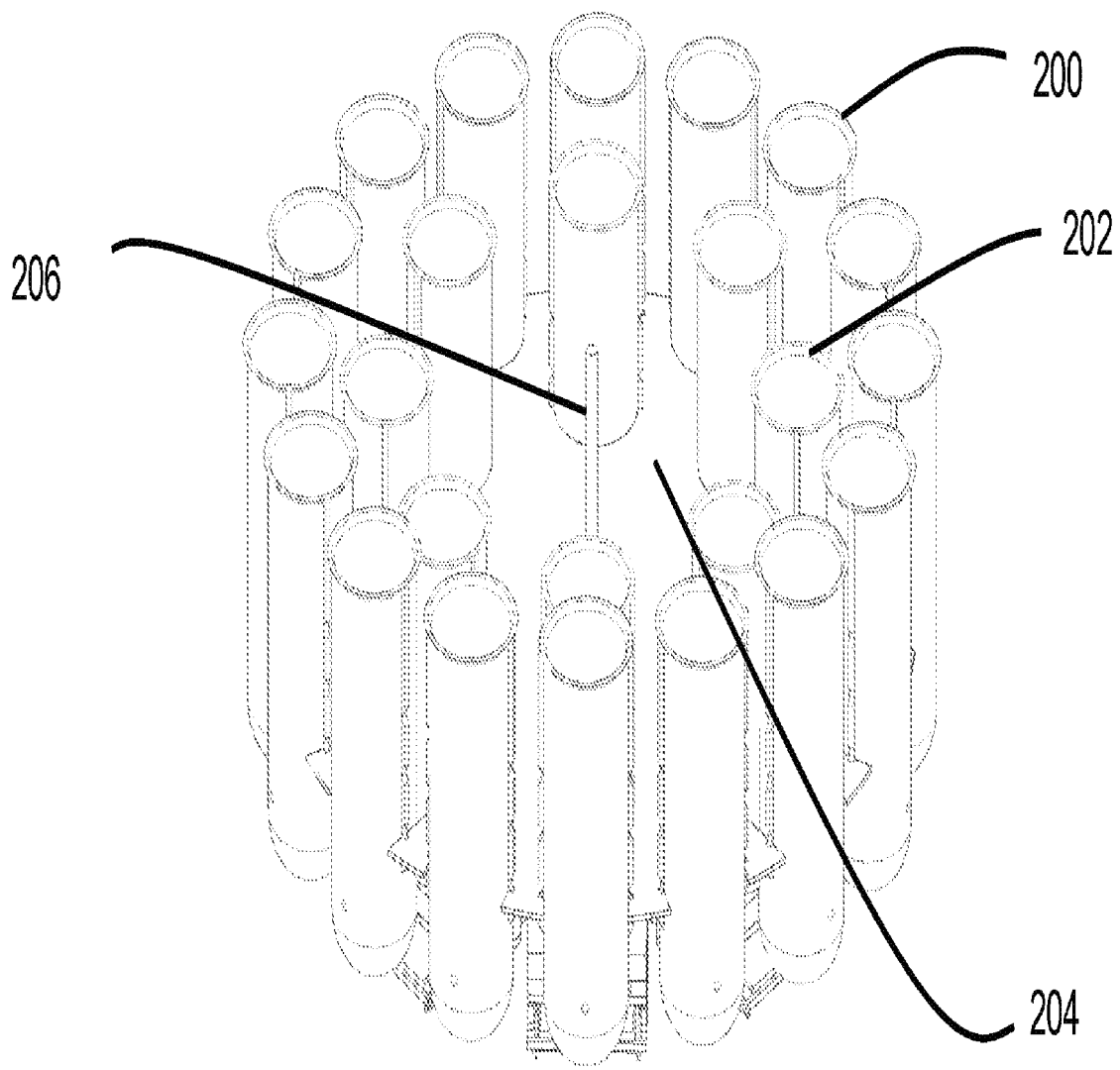
FIG. 2 depicts the carousel mechanism shown in FIG. 1.

FIG. 2 illustrates a close up view of a design of the carousel described in FIG. 1. Outer containers 200 and inner containers 202 may be placed on the carousel 204 which may contain a shaft 206. Placement of outer containers 200 and inner containers 202 on carousel 204 may be designed such that their bottom opening may be positioned substantially directly over opening(s) (not shown) in the thermally isolated carousel environment of FIG. 1. A chute configuration (not shown) may alternatively be employed wherein the containers are not substantially directly over the opening (s). Gravity feed as well as motorized movement of the food ingredients from the containers thru the opening(s) to the pan (or other receptacle) may be utilized.

Figure 3:
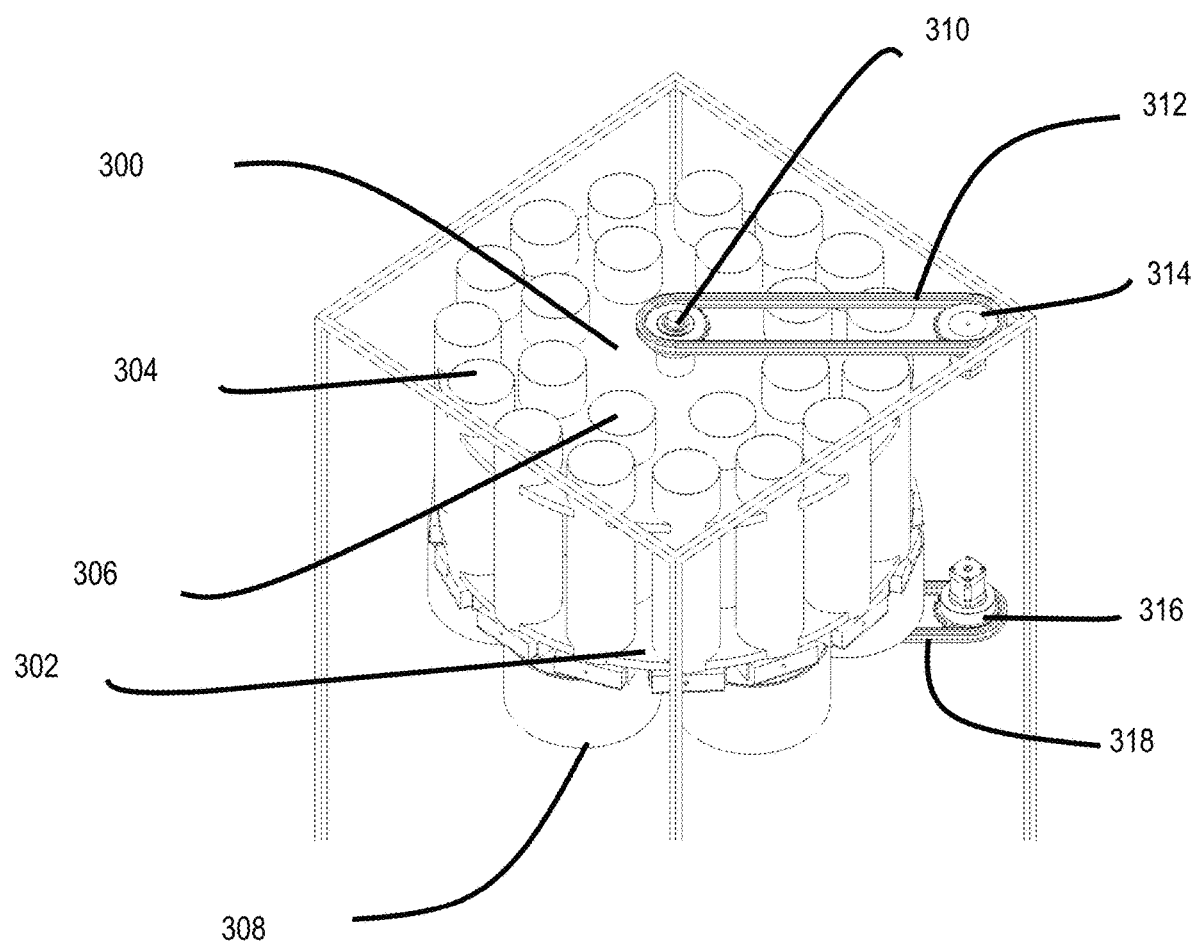
FIG. 3 illustrates an embodiment of this invention, wherein two carousels, one for housing ingredients and one for chopping ingredients, are placed atop a cooking pot.

FIG. 3 illustrates an embodiment of this present invention wherein two carousels, upper carousel 300 and lower carousel 302, may be placed above a cooking pan (not shown). The upper carousel 300 may be connected to containers having ingredients, such as outer ingredient container 304 and inner ingredient container 306. The lower carousel 302 may be connected to choppers such as chopper 308. Some choppers may contain blades to slice ingredients, some choppers may contain blades to dice ingredients, some choppers may contain blades to shred ingredients and some choppers may have other functions. The robotic cooking apparatus can control which ingredient container is placed above which chopper by rotating individual carousels upper carousel 300 and lower carousel 302, such that a certain ingredient, or combination of ingredients, may be chopped. Several mechanisms may exist to rotate carousels upper carousel 300 and lower carousel 302. For example, belts such as upper belt 312 and lower belt 318 may be used, in combination with pulleys upper carousel pulley 310, upper motor pulley 314 and lower motor pulley 316. Direct drive and other gearing mechanisms may also be utilized to rotate upper carousel 300 and lower carousel 302.

Figure 4:
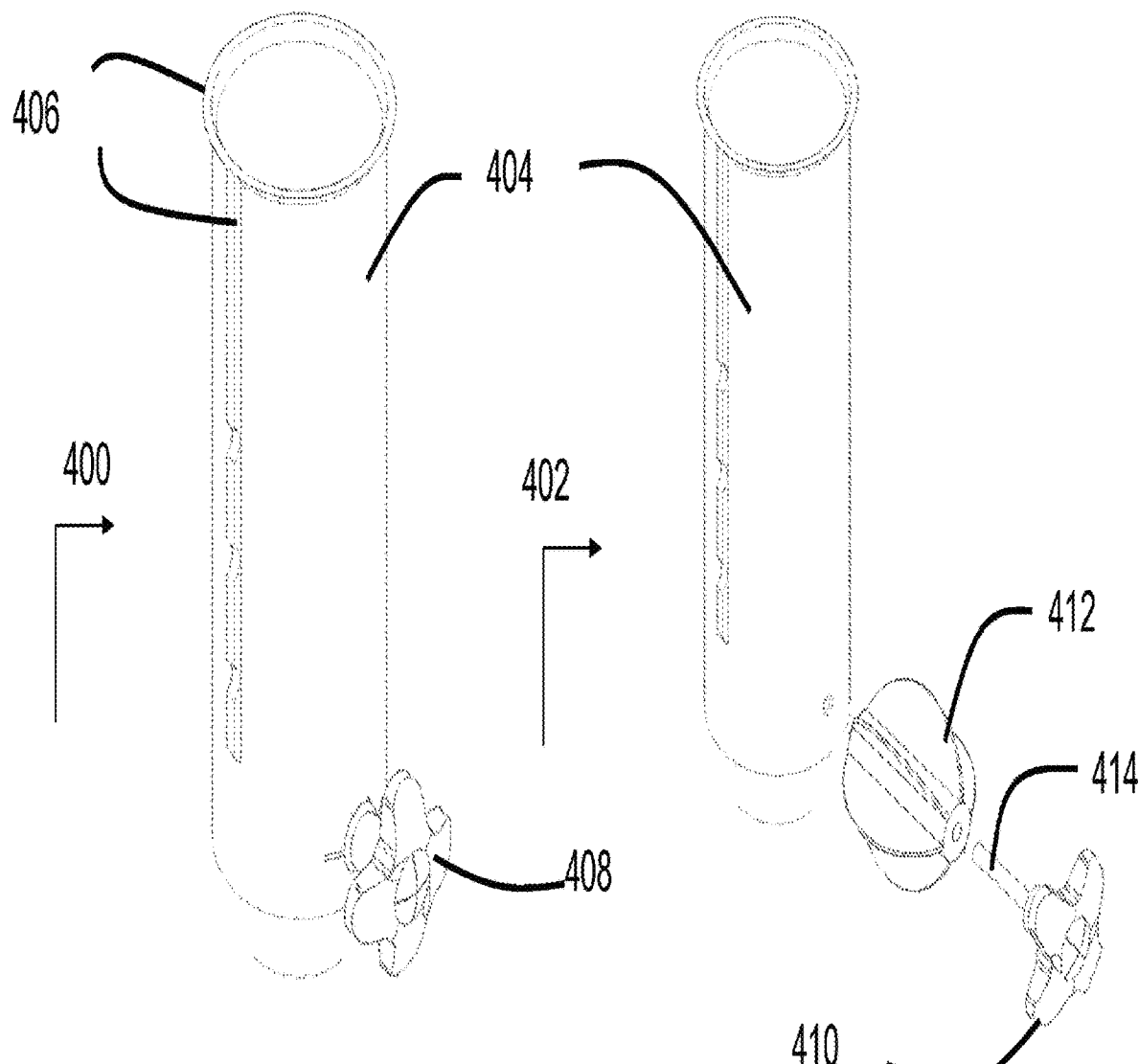
FIG. 4 illustrates an embodiment of this invention wherein a container with a rotating dispenser knob is used in combination with the carousel mechanism of FIG. 1.

FIG. 4 illustrates an embodiment of this invention, wherein the container shown in FIG. 4 may be used in conjunction with the carousel mechanism of FIG. 1 to dispense controlled amounts of ingredients. View 400 shows a side view of the container that may be used in the carousel 104 while second view 402 shows an exploded view of the container that may be used in the carousel 104. The container may include an object such as cylinder 404 for housing the ingredients. Cylinder 404 may have a square or rectangular cross sectional shape, the diameter may increase or decrease in the vertical direction, and the material composition and surface friction coefficient/roughness chosen, depending on design and engineering considerations, for example of the food ingredient type, moisture content, container cleaning/sterilization constraints and so on. Shapes such as container side 406 may be added to make insertion into a carousel mechanism easier by inserting the shapes into slots on a carousel. A shape such as handle 408 may be used to dispense controlled amounts of ingredients. The exploded second view 402 shows more details of the ingredient dispensing mechanism. When the knob 410 is rotated, the shaft 414 may rotate the paddle 412. The rotational motion may allow dispensing of controlled amounts of ingredients. Paddle 412 may be partially constructed of a flexible material, for example, such as silicone. Mass sensors (not shown) may be used in conjunction with this mechanism to determine the amount of ingredient dispensed. In addition, monitoring the rotational angle (theta) traversed by the knob 410 may provide an estimate/measure of the ingredient amount dispensed.

Figure 5:
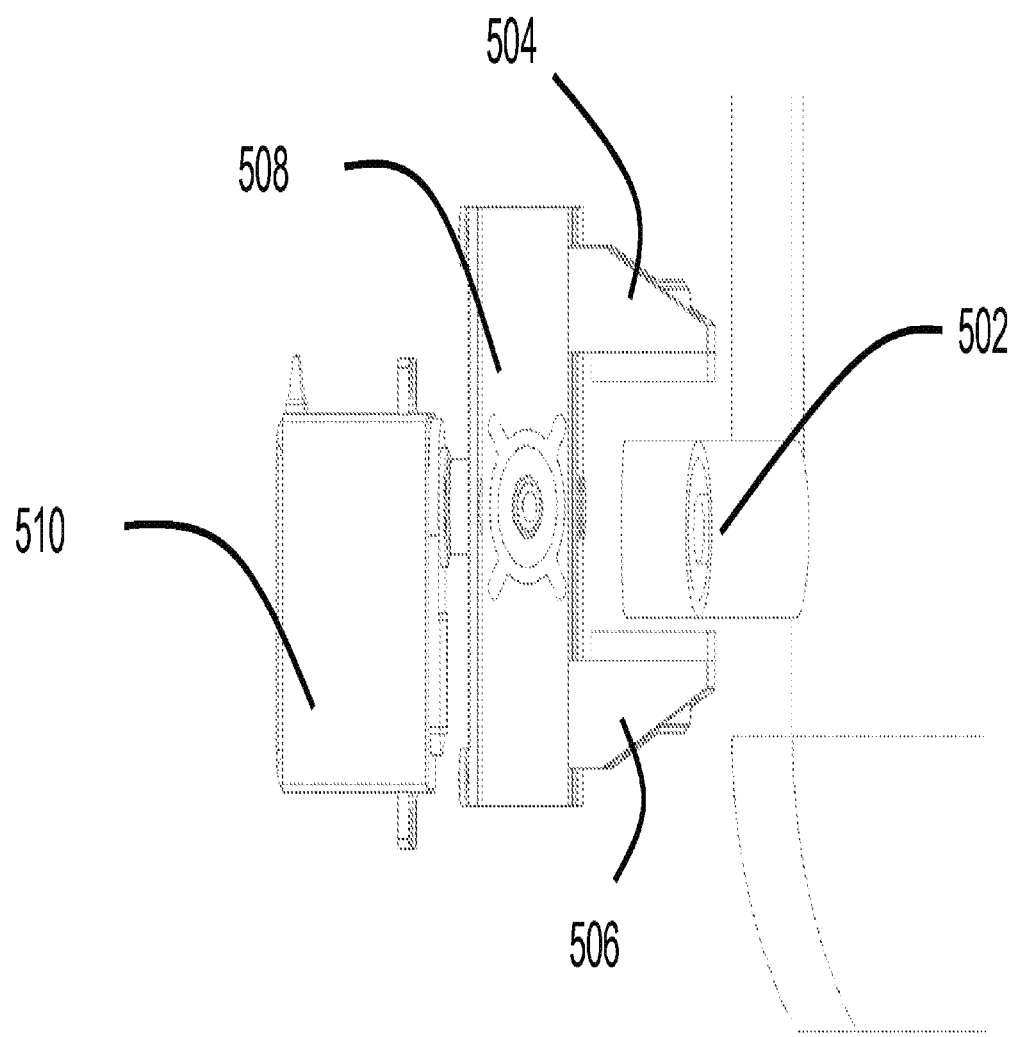
FIG. 5 illustrates an embodiment of this invention, namely an actuation mechanism for ingredient dispenser containers.

FIG. 5 describes an embodiment of this invention, which illustrates an apparatus for actuating the knob 410 of container cylinder 404 in FIG. 4 herein. Knob 402 (or some other projection) of the dispenser container may be present, and may be indicated as projection 502. To rotate the projection 502, a gripper mechanism may be used. Two arms of the gripper upper arm 504 and lower arm 506 may be used to grip and then securely hold the projection 502. Following this, the motor 510 may be used to rotate the gripper by rotating gripper body 508. In case some food items get stuck in container cylinder 404, gripper body 508 may be rotated in the opposite direction. Motor 510 and hence gripper body 508 (and ultimately the paddle 412) may also be run thru an acceleration/deceleration forward/reverse algorithm (for example, creating a vibration) to clear stuck food items. Several other mechanisms are possible to hold and rotate the projection 502, for example, utilizing a robotic arm, or single/quad gripper arms.

Figure 6A:
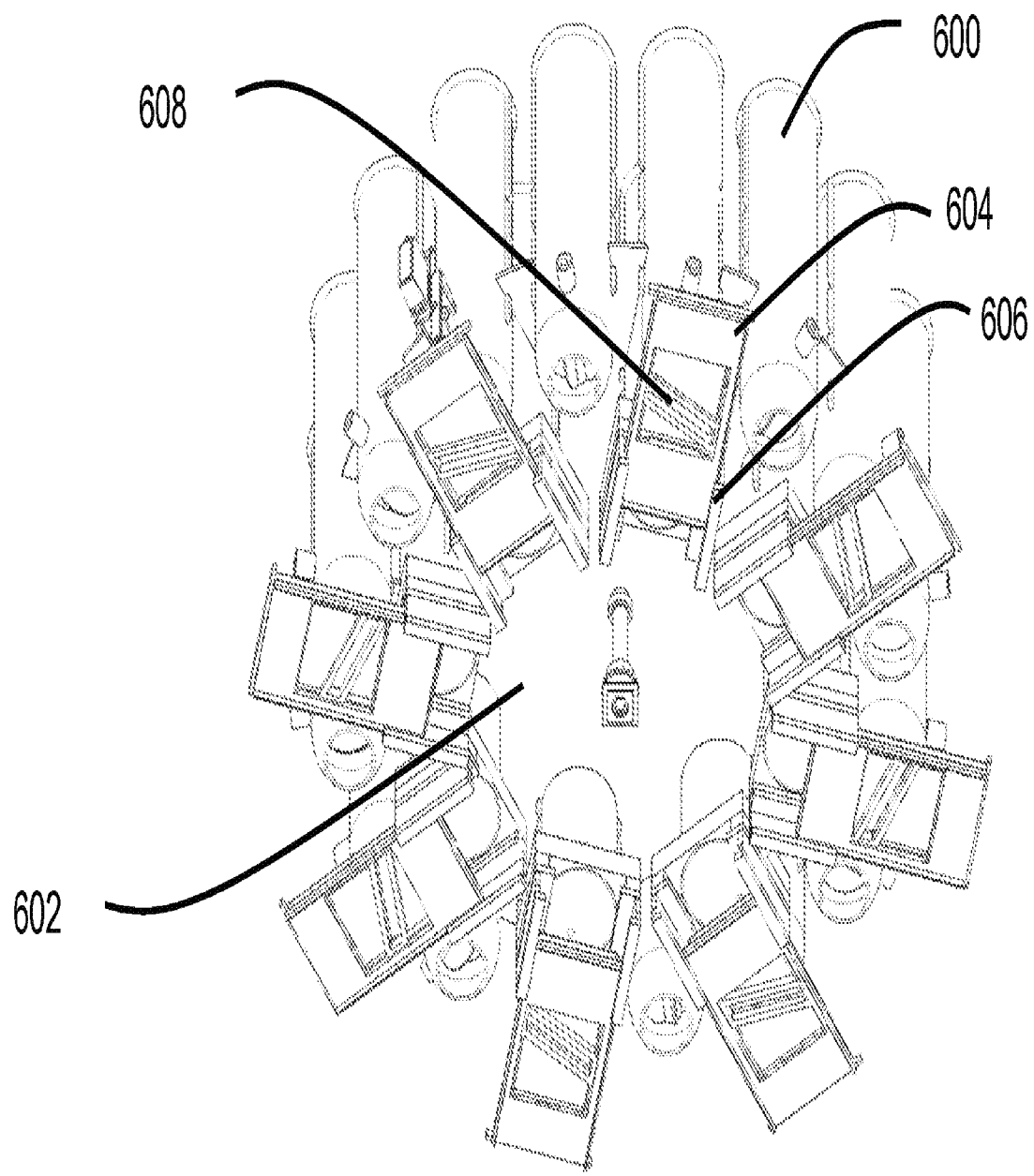
FIG. 6A illustrates an embodiment of this invention, which is an apparatus for chopping ingredients.

FIG. 6A illustrates an embodiment of this invention, which is an apparatus for chopping ingredients in the carousel mechanism that may be depicted with FIG. 1. Exemplary ingredient containers 600 may be placed in carousel 602. Chopping sliders 604 may be placed into sockets 606 at the base of ingredient containers so that they can slide back and forth in the sockets 606. Chopping blades 608 may chop up ingredients in containers when the chopping sliders 604 are moved in a certain direction. Chopping sliders 604 may be pushed and pulled using an actuator mechanism (not shown in the figure).

Figure 6B:
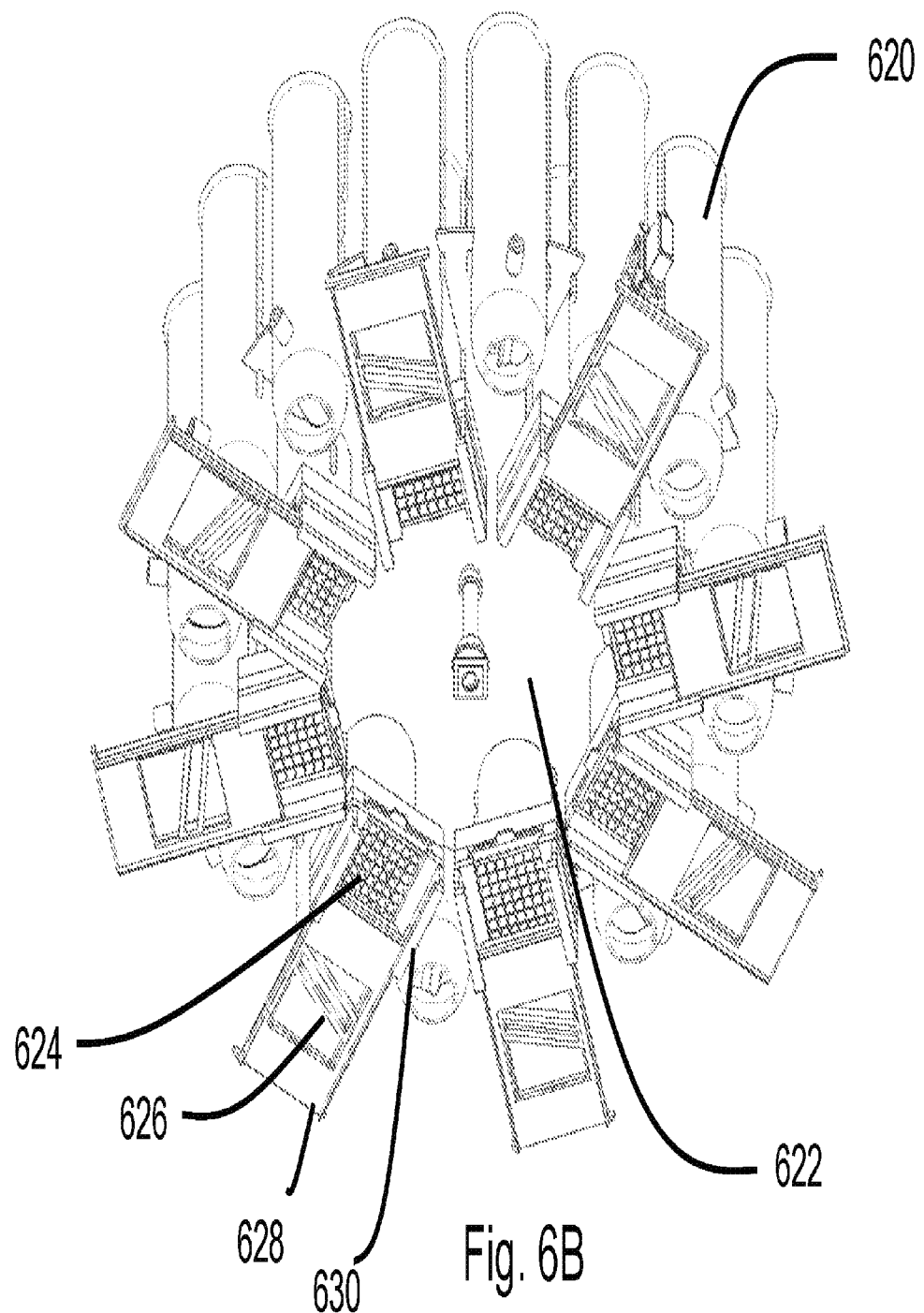
FIG. 6B illustrates an embodiment of this invention, which is an apparatus for dicing ingredients.

FIG. 6B describes an embodiment of this invention, which is an apparatus for dicing ingredients in the carousel mechanism that may be depicted with FIG. 1. Exemplary ingredient containers 620 may be placed in carousel 622. Chopping sliders 628 may be placed into sockets 630 at the base of ingredient containers so that they can slide back and forth in the sockets 630. Dicing grids, such as for example, 624 may be placed at the base of ingredient dispensers. Ingredients may be pushed down the ingredient containers using a plunger mechanism, such as for example, the plunger described. The action of ingredients being pushed down the ingredient dispenser into the dicing grid, in combination with the motion of chopping sliders 628, together may cause ingredients to be diced and dispensed. Chopping sliders 628 may also include chopping blades 626 to provide a dual use function.

Figure 7:
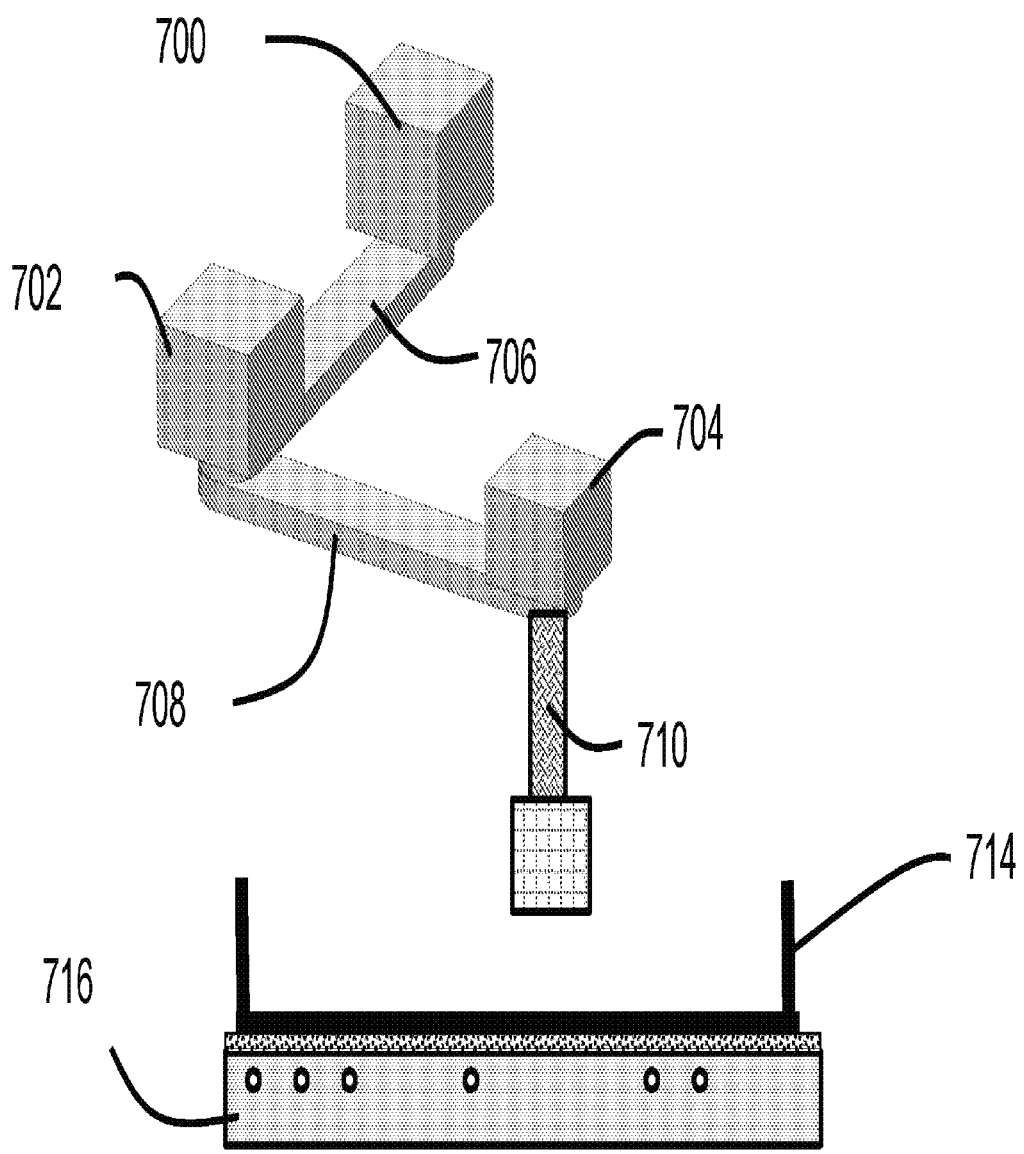
FIG. 7 illustrates an embodiment of this invention, which uses a series of links to move a stirrer to various positions.

FIG. 7 illustrates an embodiment of this invention which allows motion of components in a plane based on motion of multiple links first link 706 and second link 708. Motors first link motor 700 and second link motor 702 could be used to rotate links first link 706 and second link 708 and thus move a stirrer 710 to various points in a cooking vessel 714. Stirrer motor 704 may be utilized to provide other motions of stirrer 710, for example, rotation clockwise and counterclockwise, specific stirrer blade orientations in combination with link movement and orientation (for example, to provide a scrapping action on the surface of cooking vessel 714), and so on. The cooking vessel 714 may be located atop a heater 716. With this type of robotic system for handling the stirrer 710, wires and motors may be enclosed and thereby protected from environmental factors, such as, for example, dirt and grease. This type of link based system can be used for moving or providing motion to objects and mechanisms other than stirrers, such as, for example, spice dispensers, liquid dispensers and other objects. Several variations of this link based system may possible. For example, one could have more links than two, motors may be placed at alternative positions, Z motion and combinations of X, Y, and Z motions, and many other options may be possible.

FIG. 8 illustrates an embodiment of this invention, a solid dispensing apparatus. A paddle 806 (similar to paddle 412 of FIG. 4 herein) may be present within a food containing tube 802 (which is similar to ingredient containers of at least FIGS. 1-4, 6A and 6B herein). The tube 802 may be attached to a carousel using collars 804. The knob 808 (similar to knob 410 of FIG. 4 herein) may be rotated using the help of a motor to rotate the paddle 806 and in combination with gravity, dispense food. The term pin may also be used to describe the knob at various sections of this patent application. To reduce sticking of food in the food containing tube 802, the knob 808 may be rotated in more than one direction during the dispensing process, as described previously in at least FIG. 4 & related specification sections herein.

FIG. 9 illustrates an embodiment of this invention, which may help reduce sticking of food on the sides of container 802 depicted in FIG. 8. This may be done by having non circular sidewalls 912 on the inside of the container so that surface area of contact between the food item and the inside wall is reduced. The outside wall 910 may be circular. Several variations of these embodiments may be possible. For example, one could have non-circular inner and outer walls and one may use wave-like patterns or other patterns on the inner walls to reduce sticking. The pattern could be tuned or 'matched' to the type and shape of the food ingredient. For example, a vertical wave pattern could be the half or quarter period of the average size ('wave') of the food item.

Figure 10A:
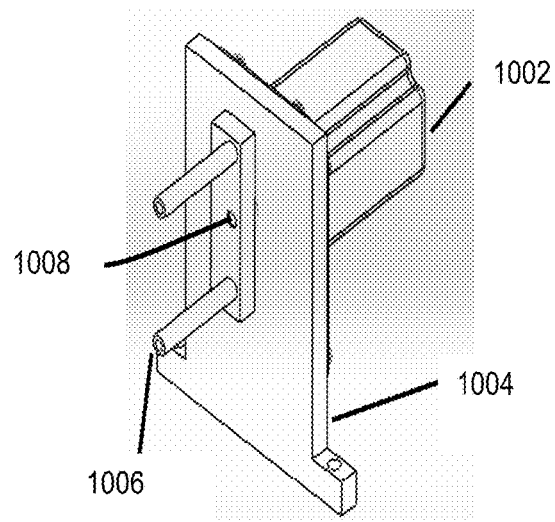
FIG. 10A and FIG. 10B illustrate embodiments of this invention, wherein the mechanism for dispensing and sensing is described.
Figure 10B:
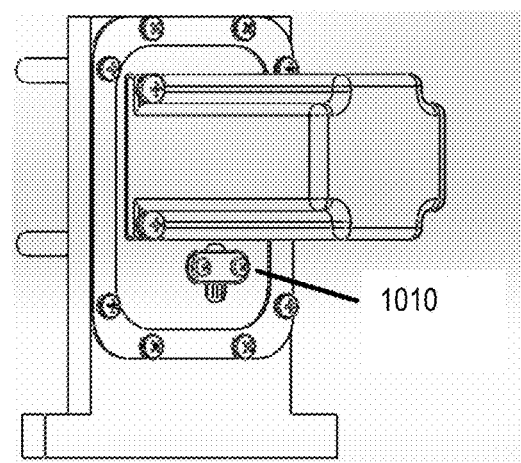

FIG. 10A and FIG. 10B illustrate an embodiment of this invention, a mechanism to rotate the knob 808 shown in FIG. 8. In FIG. 10A, the motor 1002 may be used to rotate a shaft 1008 which may in turn rotate the dispensing mechanism 1006. A magnet may be used as part of the dispensing mechanism 1006. A hall sensor 1010 shown in FIG. 10B may be used to determine the rest position of the knob 808 after the dispense operation is complete.

Figure 11:
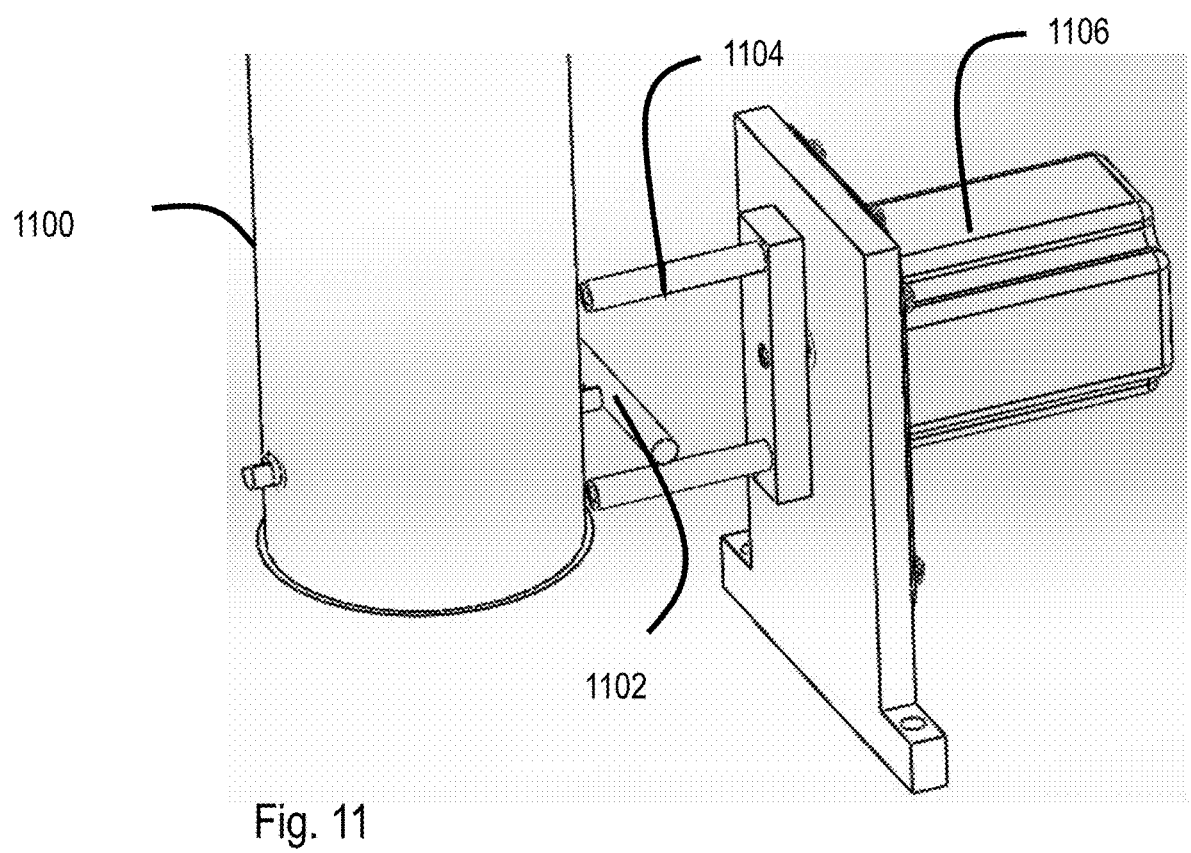
FIG. 11 illustrates an embodiment of this invention, wherein the mechanism for dispensing food is described.

FIG. 11 illustrates an embodiment of this invention, a mechanism to dispense food, which may include ingredient container 1100, ingredient container knob 1102, dispensing knob 1104 and motor 1106. A motor 1106 may be used to rotate the dispensing knob 1104. When dispensing knob 1104 rotates, the ingredient container's knob 1102 may also rotate. This, in turn, may dispense food ingredients from ingredient container 1100. The term "pin" may be used instead of the term "knob" at various sections of this document.

Figures 12A, 12B:
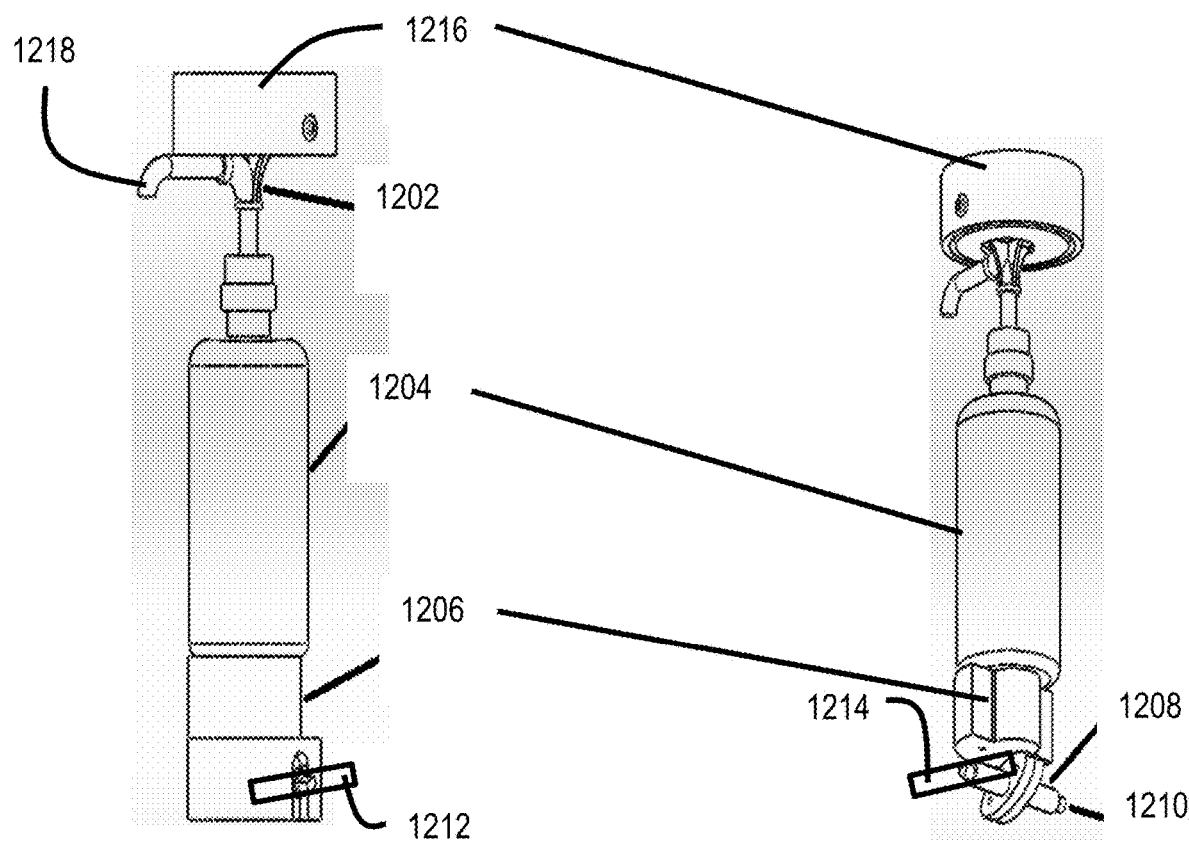
FIG. 12A and FIG. 12B illustrate embodiments of this invention that dispense liquids.

FIG. 12A and FIG. 12B illustrate embodiments of this invention, a liquid dispensing system, which may include pin 1202, ingredient container 1204, spacer 1206, cam mechanism 1208, shaft 1210, ingredient container knob 1212, pin 1214, head 1216 and spout 1218. When the ingredient container knob 1212 may be rotated, the cam mechanism 1208 may be pushed up on the spacer 1206. When the cam mechanism 1208 is pushed up, the spout 1218 may dispense the ingredient from the container 1204 using a pump mechanism. A one way valve may be added to the end of the spout 1218 to reduce dripping of the liquid when dispensing action is not required.

Figure 13:
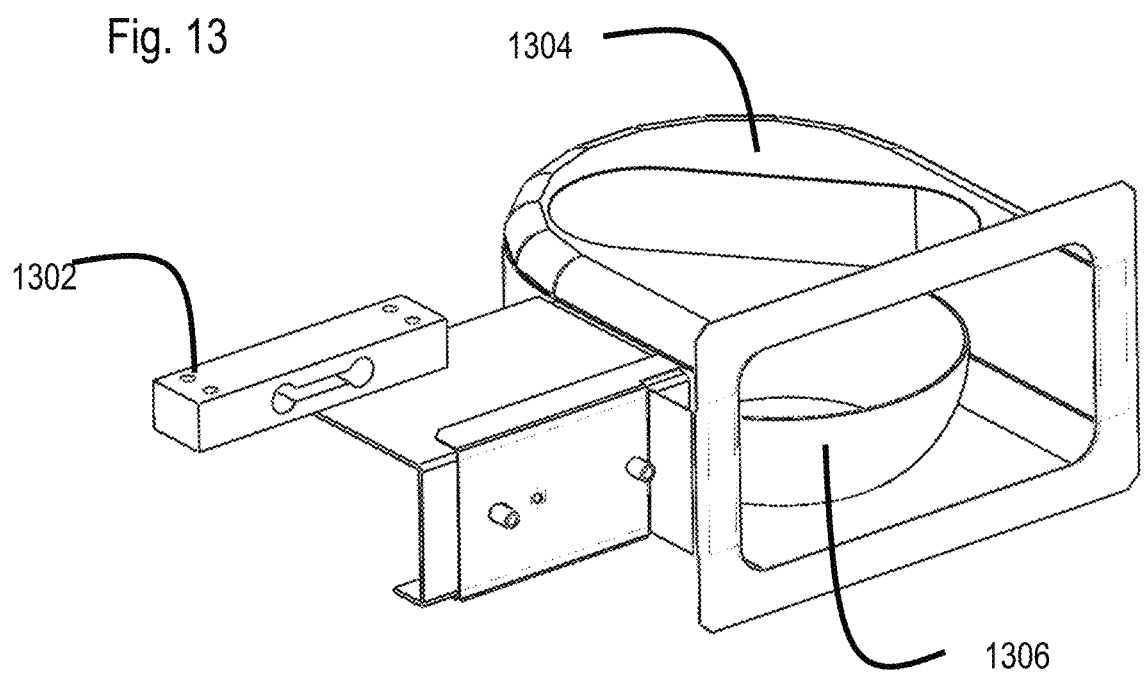
FIG. 13 illustrates an embodiment of this invention that shows a mass sensor system.

FIG. 13 illustrates an embodiment of this invention, a mass sensor scheme, which may include load cell 1302, mass measuring system 1304 and bowl 1306. A load cell 1302 may be used and attached to a mass measuring system 1304. When food falls into the mass measuring system 1304 through the top opening into the salad bowl 1306, the weight may be measured. Based on whether the desired weight of the ingredient has been dispensed, the motor for dispensing the ingredient may be turned to OFF position. The mass sensor system shown in FIG. 13 is isolated from the food zone where the salad bowl or cooking container or induction heater may be placed. According to an embodiment of this invention, the bowl 1306 may be placed such that it is isolated from wires associated with the load cell 1302.

Figure 14:
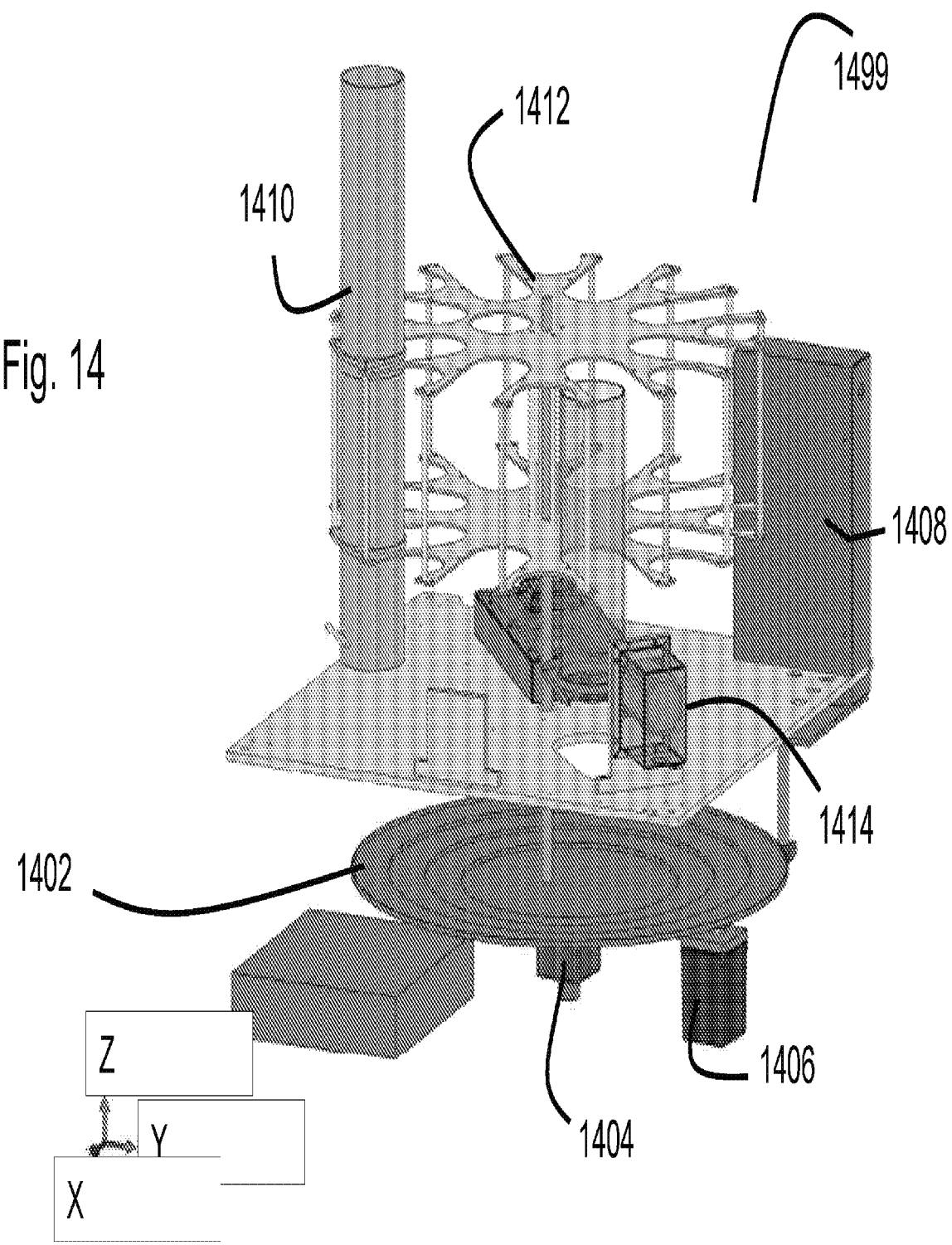
FIG. 14 illustrates an embodiment of this invention that shows a system capable processing various types of food.

FIG. 14 is an illustration of an embodiment of this invention which illustrates a food system 1499, part of a robotic cooking apparatus, capable of helping make pizza, cook food, make burritos, make salads and make several other types of food. Food system 1499 may include plate 1402, second link motor 1404, first link motor 1406, compartment 1408, ingredient containers 1410, carousel 1412 and dispenser motor 1414. Ingredients may be placed in ingredient containers 1410 (one shown for clarity) and may be dispensed using motion of the carousel 1412 and dispensing mechanisms which use dispenser motors such as, for example, dispenser motor 1414. The dispensing mechanisms may be shared among multiple containers to lower cost and weight of the food making machine.

In case of making pizza, the pizza base may be placed on the plate 1402. The plate 1402 may be moved using a multi-link mechanism which in turn may move based on motion of motors second link motor 1404, first link motor 1406 and additional motors placed in compartment 1408. Ingredients may be dropped on the pizza base using technologies described in FIG. 1-FIG. 13 herein. The pizza base may be moved using motion of the plate 1402 to distribute the ingredients over the pizza area.

In case of making burritos, the tortilla may be placed on the plate 1402 and ingredients may be dispensed atop it.

In case of making salads, the salad bowl may be placed on the plate 1402 and ingredients may be dispensed atop it.

In case of making one pot meals, such as, for example, stews and many Indian and Chinese and Thai entrees, an induction heater and the pot may be placed atop the plate 1402 and ingredients may be dispensed into the pot. An additional robot arm may be used to stir the food. The robot arm may be designed as a Cartesian robot system with a stirrer at the end or using a technique similar to the one described in FIG. 7 herein or using some other technique.

Figure 15:
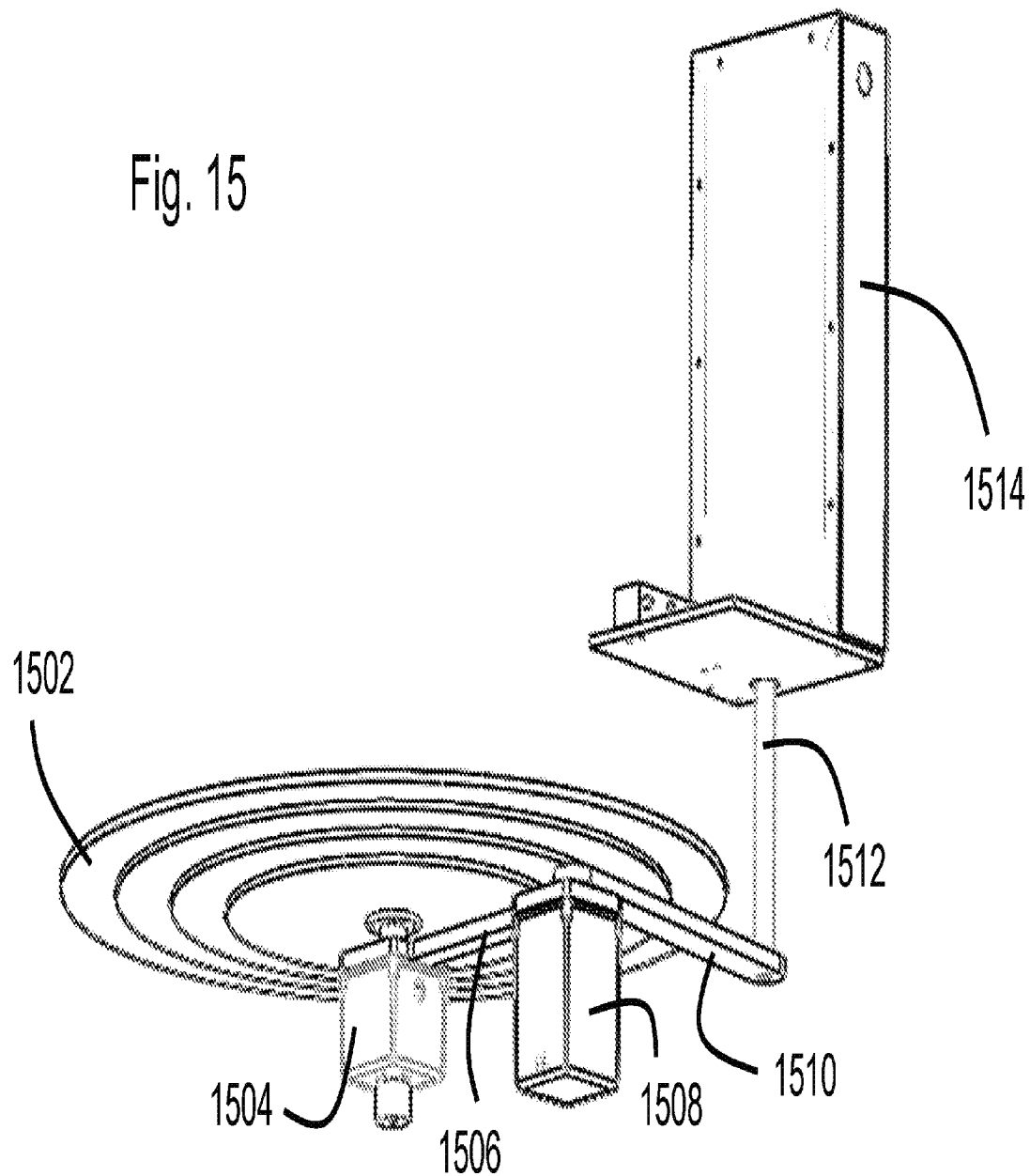
FIG. 15 illustrates an embodiment of this invention that shows the system for placing the salad bowl or pizza base or cooking pot and heater or tortilla (for making burritos) and in general for placing the base that is processed further.

FIG. 15 is an illustration of an embodiment of this invention, which illustrates a closer view of the mechanism for moving the plate 1402 of FIG. 14. The plate 1502 may be moved using motion of links third link 1506, second link 1510 and first link 1512. The motors third link motor 1504 and second link motor 1508 may rotate to move links third link 1506 and second link 1510 and thereby move the plate 1502 in the horizontal plane. The first link 1512 may move up and down via motors placed within compartment 1514. Several other mechanisms may provide movement to the plate 1502 in the X, Y, Z plane and dispense ingredients onto it. For example, placing plate 1502 on a 3D motion table.

Figure 16:
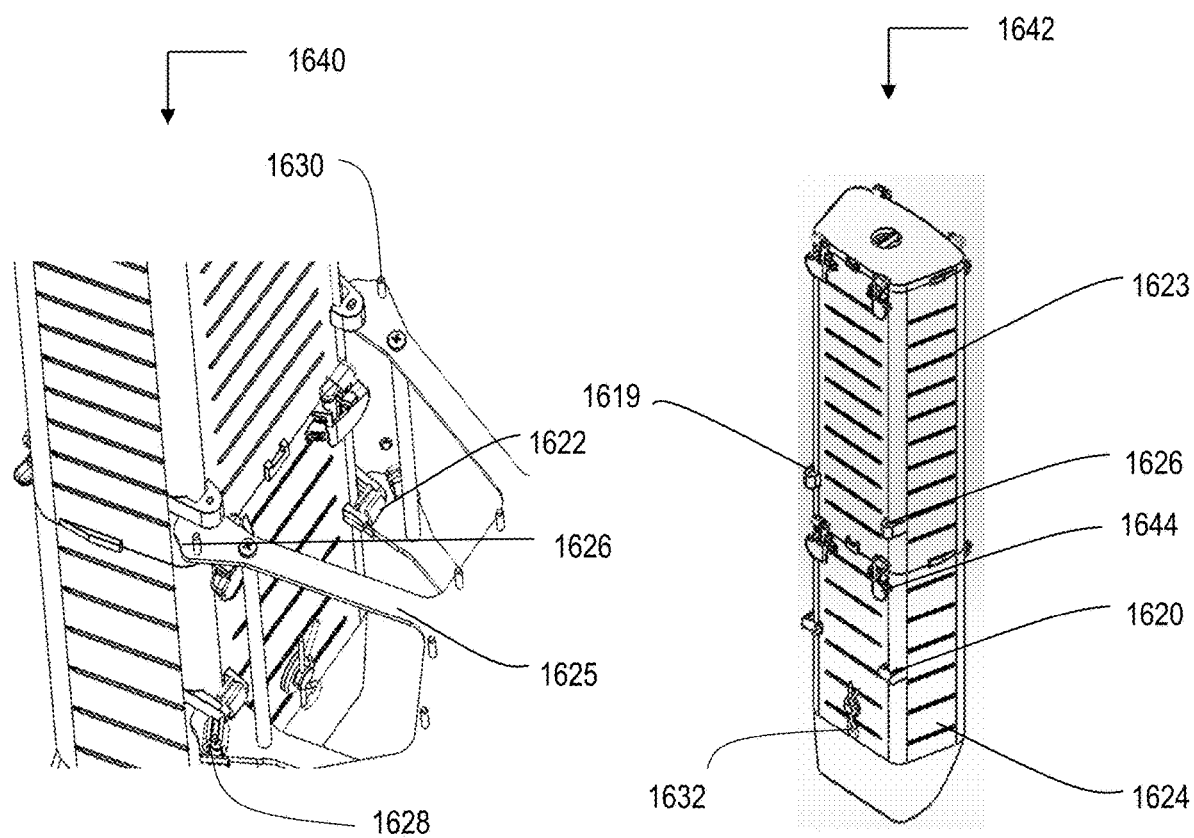
FIG. 16 illustrates an embodiment of this invention that illustrates a modular ingredient container and shows how it may be attached to a carousel.

FIG. 16 is an illustration of an embodiment of this invention that describes a modular ingredient container and shows how it may be attached to a carousel. The modular ingredient container 1642 (and blow-up 1640) may consist of two or more portions (such as, for example, upper portion 1623 and lower portion 1624) that may be attached to each other using a latch mechanism 1644. Using modular ingredient containers is an innovation that provides several benefits: (1) If one wants to increase food capacity of the apparatus, one more modular ingredient container portions can be added to provide extra capacity (2) A big size ingredient container, when split into two smaller ingredient containers, is easier to fit into a dishwasher or sink for cleaning purposes. The modular ingredient containers may be attached to carousel 1625 using various mechanisms. These may include a pin-mechanism, wherein pins such as pin 1630 may be inserted into slots such as left slot 1619 and right slot 1626. Modular ingredient containers may also be attached to carousel 1625 using clip mechanisms, wherein a clip 1628 may be used to attach to a portion of an ingredient container such as location 1620. An example where a portion of an ingredient container is attached to a clip 1622. Several alternative mechanisms may be possible to attach an ingredient container to the carousel. For example, magnets, for example a combination of permanent and electromagnets may be used. Pins, such as for example, cotter pins 1632 may be used to make sure a shaft used in the canister does not slip out.

Figure 17:
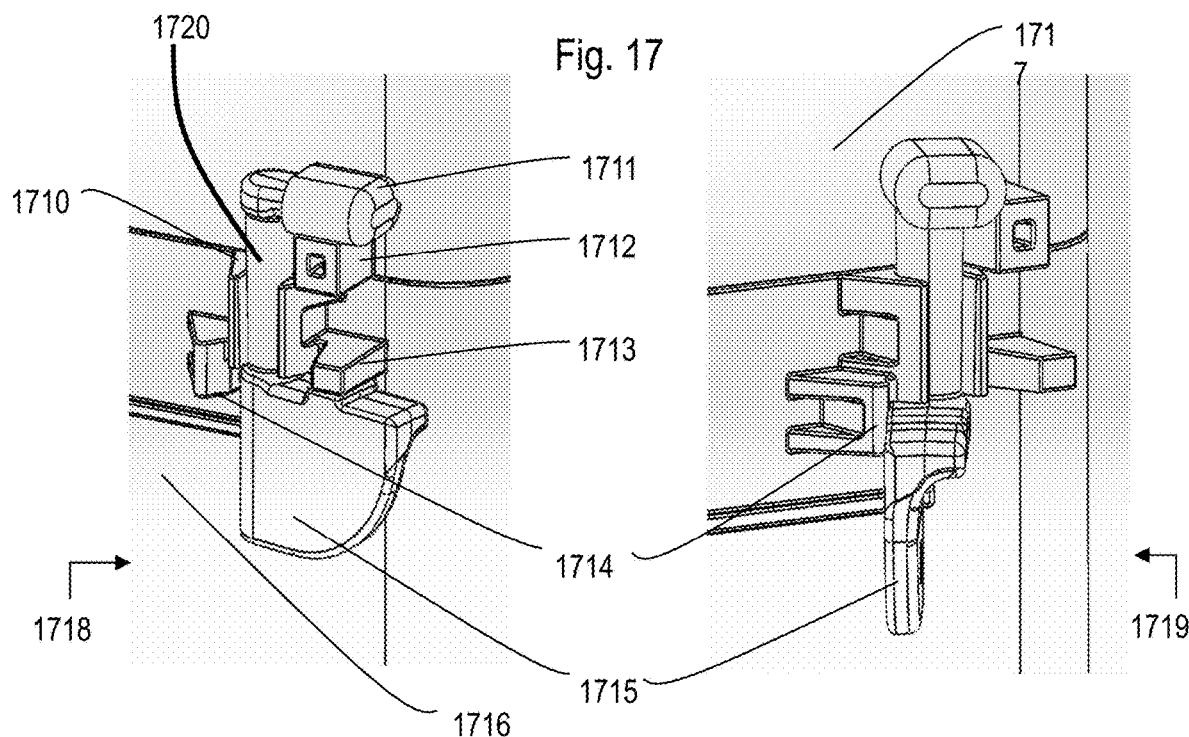
FIG. 17 illustrates an embodiment of this invention, that shows how modular ingredient containers may be attached to each other.

FIG. 17 is an illustration of an embodiment of this invention how different portions of an ingredient container may be attached to each other. Projections such as first projection 1712, second projection 1713, third projection 1710 and fourth projection 1714 may be added to ingredient container portions upper portion 1717 and lower portion 1716 which may need to be attached to each other. A joiner may be added that may consist of parts such as flap 1715, elastic flap 1711 and stem 1720. The elastic flap 1711 may allow for a good fit despite the manufactured tolerance of various parts. It may consist of a flexible material that can deform to allow a good fit. Examples of flexible materials may include silicone rubber, polyurethane and many other materials. The stem 1720, flap 1715 and other parts of the joiner may consist of non-flexible materials so that multiple parts of an ingredient container are closed securely, without leakage of material. Examples of materials for this application may include polycarbonate, PVC and many other materials. The ingredient containers may be open or closed by moving joiners into open or closed positions. FIG. 17 includes locked position 1718 and unlocked position 1719 illustrations. At various sections of this patent application, the term latch may be used in place of the term joiner.

Figure 18:
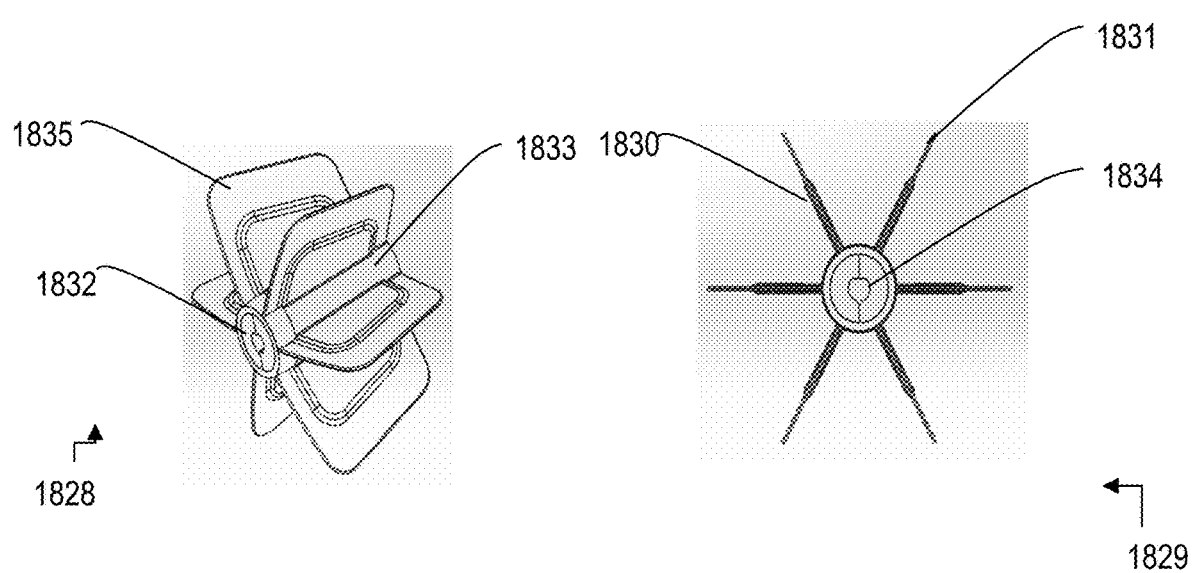
FIG. 18 illustrates an embodiment of this invention, a paddle for dispensing ingredients.

FIG. 18 is an illustration of an embodiment of this invention how paddles may be designed for use in the ingredient containers. The paddles may, for example, be constructed of similar or multiple different materials for core 1834 and external portions first extension 1830 and second extension 1831. According to one embodiment of this invention, the core 1834 may primarily include a non-flexible plastic, such as, for example, polycarbonate, PVC or other suitable non-flexible plastic. The external portions first extension 1830 and second extension 1831 may have flexible materials, such as, for example, silicone rubber, polyurethane or some such material. According to one embodiment of this invention, the external portion first extension 1830 may be thicker than the external portion second extension 1831. This could provide the most effective combination of stiffness and flexibility for dispensing specific ingredients. Alternatively, one could have just one thickness for the whole external portion. It will be clear to one skilled in the art that several different thicknesses for the non-flexible plastic may be possible at different external portions of the paddle, to provide various mechanical properties needed for dispensing ingredients. According to an embodiment of this invention, the external portions first extension 1830 and second extension 1831 may be overmolded atop the core 1834. Holes 1832 may be inserted into the core 1834 to allow more convenient overmolding.

Figure 19:
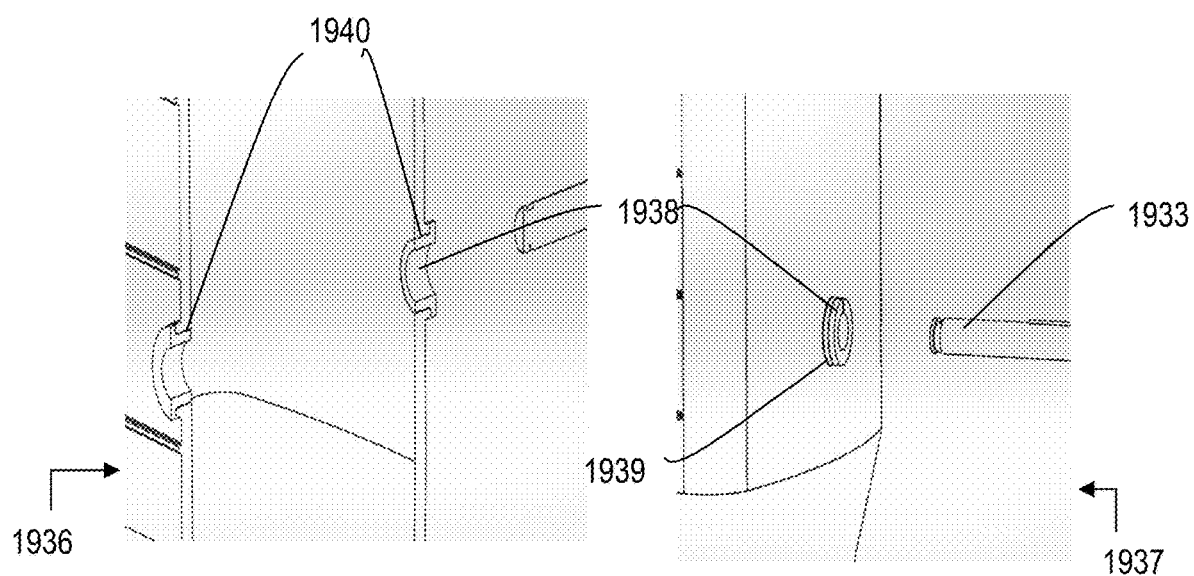
FIG. 19 illustrates an embodiment of this invention, a bearing for ingredient containers.

FIG. 19 is an illustration of an embodiment of this invention how bearings may be used to provide long-term reliability to containers. When shafts 1933 are inserted into containers 1936 and rotated over long-periods of time to dispense ingredients, plastic used in containers 1936 may degrade and/or wear away. By inserting bearings outer bearing 1940 and inner bearing 1938 into the ingredient container 1936, the reliability challenges may be reduced. Various types of bearings and materials for bearings may be possible, and could reduce friction, degradation or wear.

FIGS. 20A-20C illustrate an embodiment of this invention, wherein multiple hall sensors and magnets may be placed within a dispenser motor assembly to more accurately dispense ingredients. FIG. 20A indicates a dispensing actuator arm 2004, a motor shaft 2006 that rotates actuator arm 2004, a plate 2008 and a motor cover 2002. Two Hall Sensors sensor one 2010 and sensor two 2012 may be used to detect the location of the actuator arm 2014 based on position of magnets top magnet 2016 and bottom magnet 2018. When a magnet is directly above a sensor during rotational motion of actuator arm 2014, the sensor may indicate it and give feedback to the control PCB on location of the actuator arm. Various types of sensors may be possible, not just Hall sensors. Magnets may be of various shapes, sizes and types. More than two Hall sensors may be used. A single Hall sensor architecture may be used as well. Alternatively, an encoder may be used in the motor to indicate its position.

Figure 21:
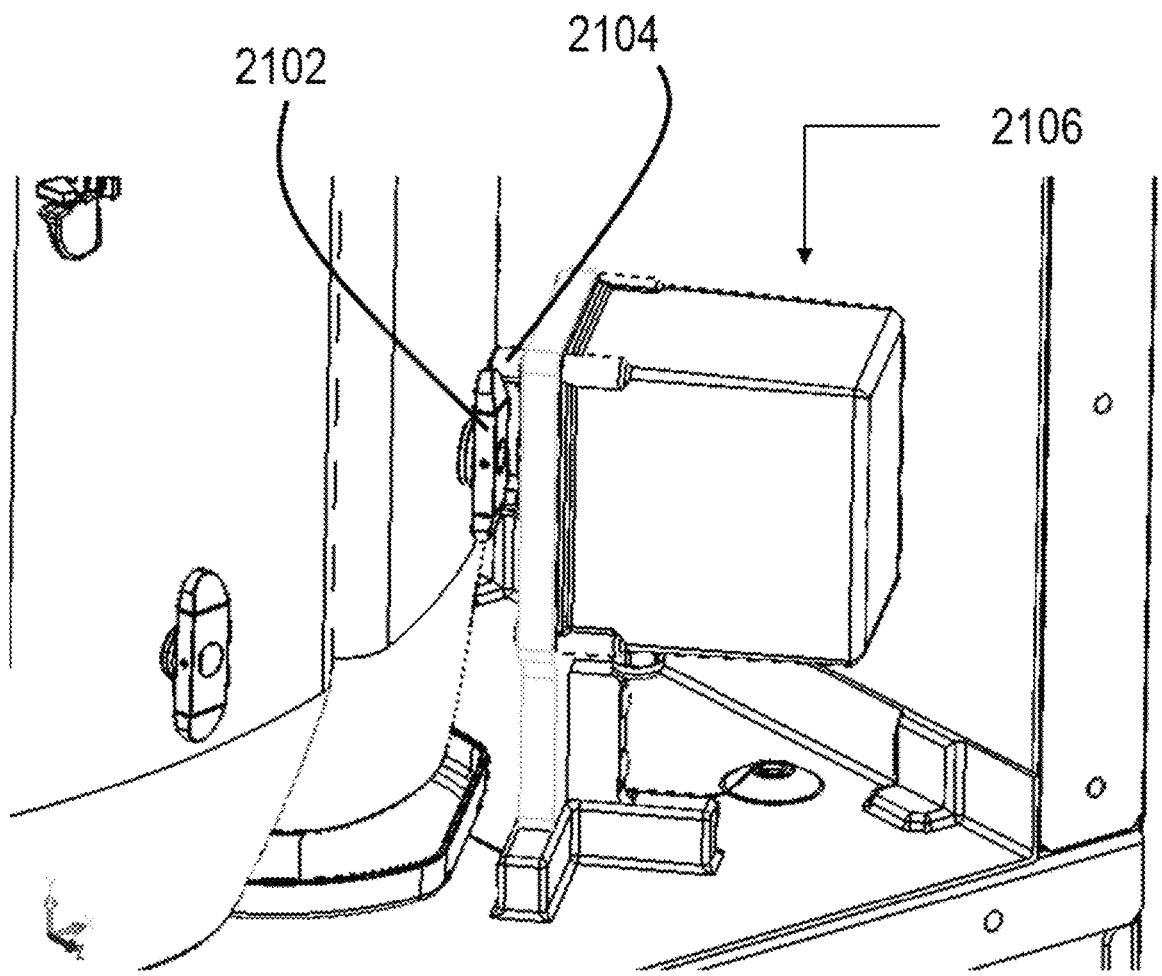
FIG. 21 illustrates an issue with a proposed dispensing system, wherein vertical knobs can collide with an actuator used for dispensing.

FIG. 21 illustrates an issue that arises when using a pin-dispenser rod actuator system 2106. The pin 2102 and actuator arm 2104 may be aligned in the same direction and could crash during motion of a carousel. This needs to be avoided for proper system operation. FIG. 22 illustrates an embodiment of this invention, a system for aligning pin 2204 so that it does not collide with the actuator arm shown in FIG. 21. A pin straightener 2202 may be placed in the apparatus. When the carousel rotates, pins 2204 may be automatically aligned into a horizontal direction due to engagement with the pin straightener 2202.

FIGS. 23A-23B illustrate an embodiment of this invention, wherein a touchscreen may be used to control the operation of a food preparation/robotic cooking apparatus having one or more of the features indicated in FIG. 1-22 and FIG. 24-28. The touchscreen 2308 may be placed within door 2306, as indicated in FIG. 23B. FIG. 23A indicates the back side of the door 2304 and view 2302 indicates an exemplary carousel system with exemplary canisters loaded on it. Customers may use the touchscreen 2308 to indicate their food choices and the apparatus indicated in FIG. 23A-B may prepare the food.

Figure 24A:
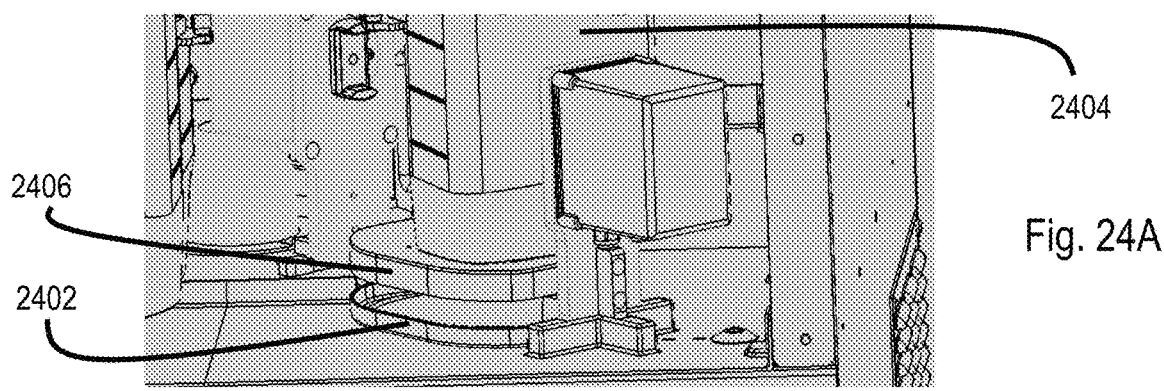
FIGS. 24A-24B illustrate an embodiment of this invention, which show how thermal insulation is provided between the chamber where ingredients are kept and other portions of the apparatus.
Figure 24B:
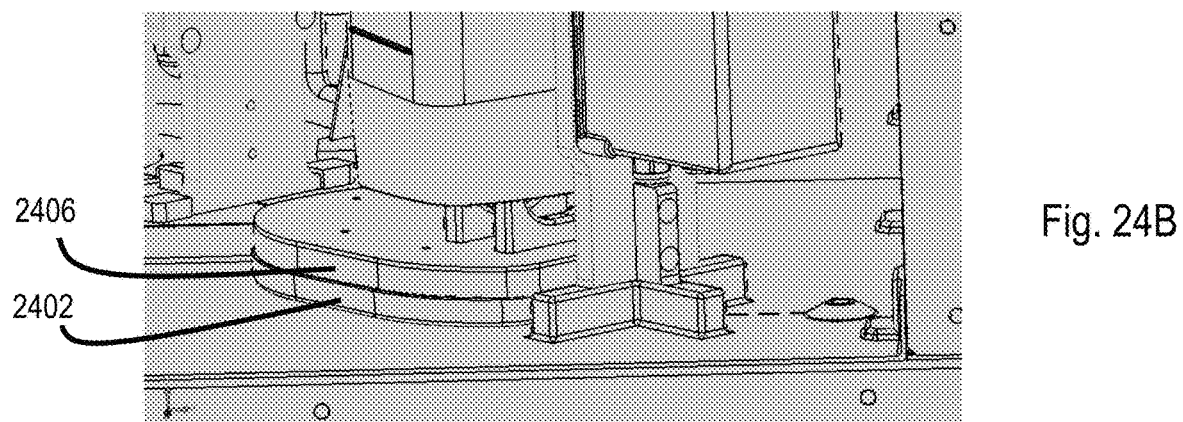

Food preparation apparatuses as shown in this patent application frequently need to be refrigerated to store food over prolonged periods of time without spoilage. FIG. 24A-B illustrates an embodiment of this invention, which is a system for thermally insulating the food storage chamber of the apparatus. The system may consist of an insulation canister 2404 meant for insulation purposes. One position of the insulation canister 2404 may be indicated in FIG. 24A, where the insulation layer 2406 does not contact the food opening 2402 i.e. the food opening is unsealed. Another position of the insulation canister 2404 may be indicated in FIG. 24B wherein the insulation layer 2406 may contact the food opening 2402, seal it and prevent significant heat from entering the chamber. The insulation layer 2406 may include a good insulator, such as, for example, silicone or some other insulation material. The insulation layer 2406 may also include a material which has some flexibility so that it gives a tight fit to the food opening 2402. When the apparatus is not being used for making food, a carousel may move the canister meant for insulation (insulation canister 2404) directly above the food opening 2402 and keep the food storage chamber insulated. It will be clear to one skilled in the art that several variations of this embodiment may be possible. For example, shape of canisters, insulation layers and food openings may be different than illustrated. Insulation canister may also contain some insulative material in addition to insulation layer 2406.

Figure 25:
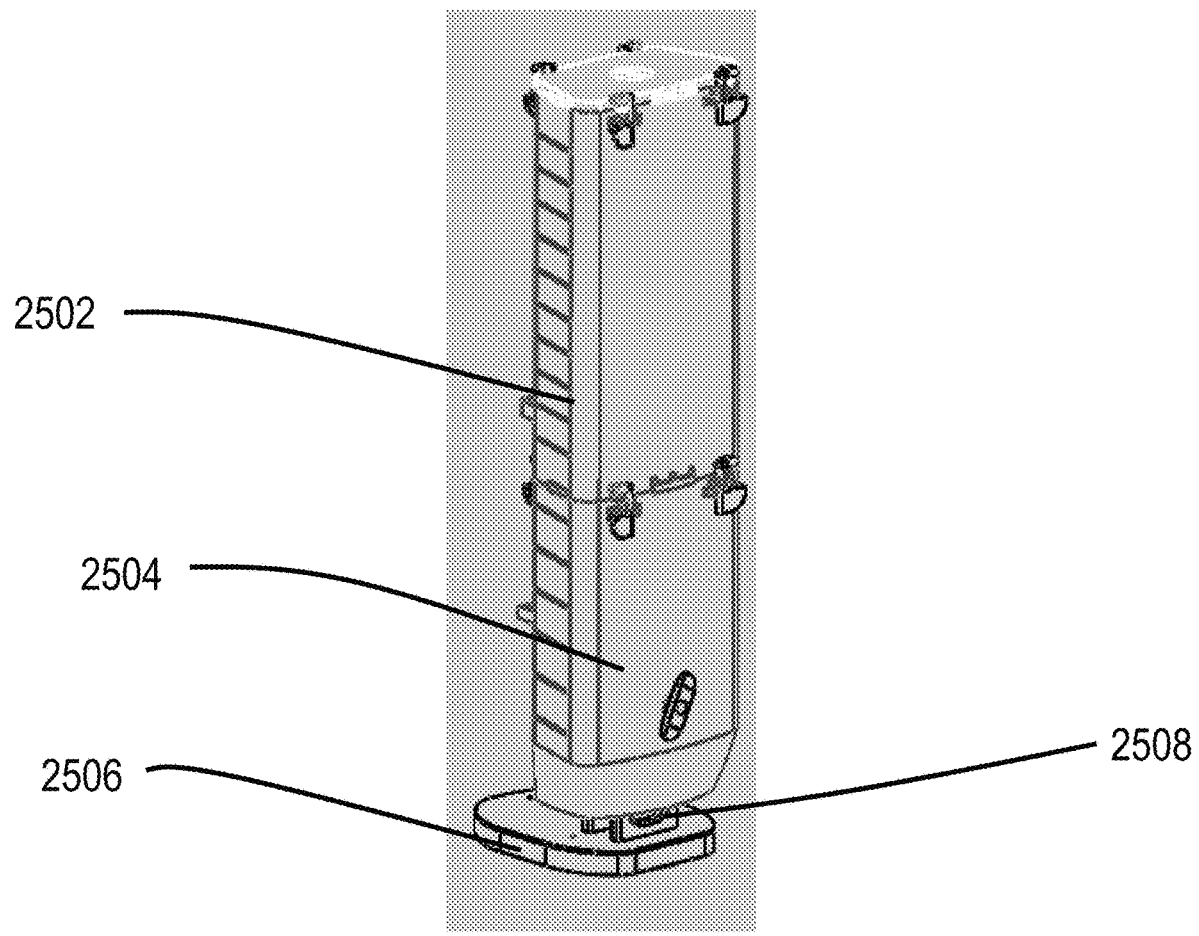
FIG. 25 illustrates an embodiment of this invention, which shows how a container may be used for providing thermal insulation by closing the hole where ingredients drop.
Figure 26A:
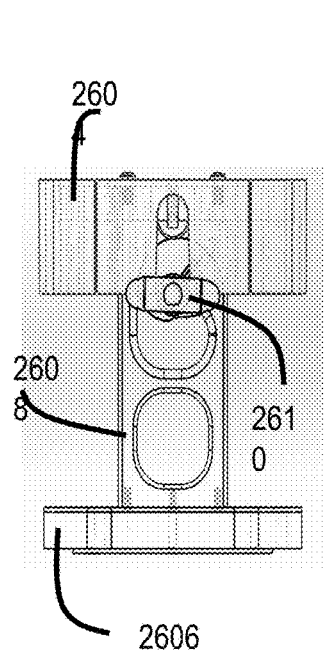
FIGS. 26A-26C illustrate an embodiment of this invention, which show a mechanism for opening and closing a hole where ingredients drop.
Figure 26B:
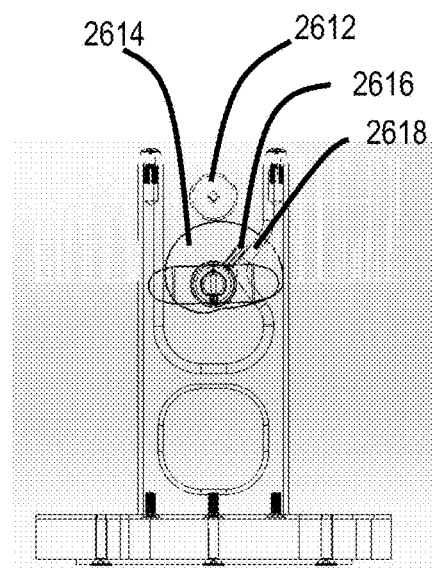
Figure 26C:
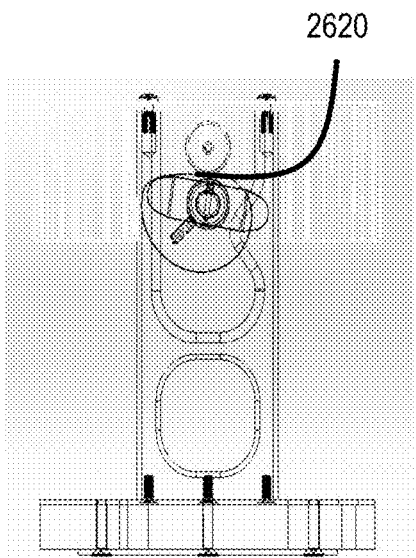

FIG. 25 illustrates different portions of the insulation canister described in FIGS. 24A-24B. The canister may be composed of two portions, upper portion 2502 and lower portion 2504, for example. The insulation layer 2506 may be connected to a mechanism within the insulation canister using pieces 2508. FIGS. 26A-26C illustrates a simplified view of the internal mechanism within an insulation canister. It will be clear to one skilled in the art that the mechanism shown in FIG. 26A-26C is exemplary, and several variations may exist. An insulation layer 2606 may be connected to a platform 2604 that moves within a canister. A pin 2610 may be rotated with a dispensing actuator similar to those described earlier in this patent application. The pin may actuate a mechanism consisting of a cam 2614 using a shaft. FIG. 26B may illustrate one position of the mechanism, where the portion 2616 of cam 2614 may come in contact with the wall 2618. A wheel 2612 may allow smooth motion of the cam 2614. The platform 2604 is not shown in FIG. 26B-26C to better illustrate the working of the mechanism. FIG. 26C may illustrate another position of the mechanism, where the cam 2620 may be in another stable position. One of the key factors of the invention shown in FIG. 26A-26C is the fact that the cam 2614 may be in two stable positions. This provides a stable open and closed position of insulation layer 2606, 'closed' with respect to food opening 2402 when actuated 'down', and 'open' with respect to food opening 2402 when the cam position pulls insulation layer 2606 'up' so that the insulation canister 2404 can rotate freely on the carousel. Thus the insulation canister may be operated by the same motor/cam system as the normal food dispensing operation.

Figure 27:
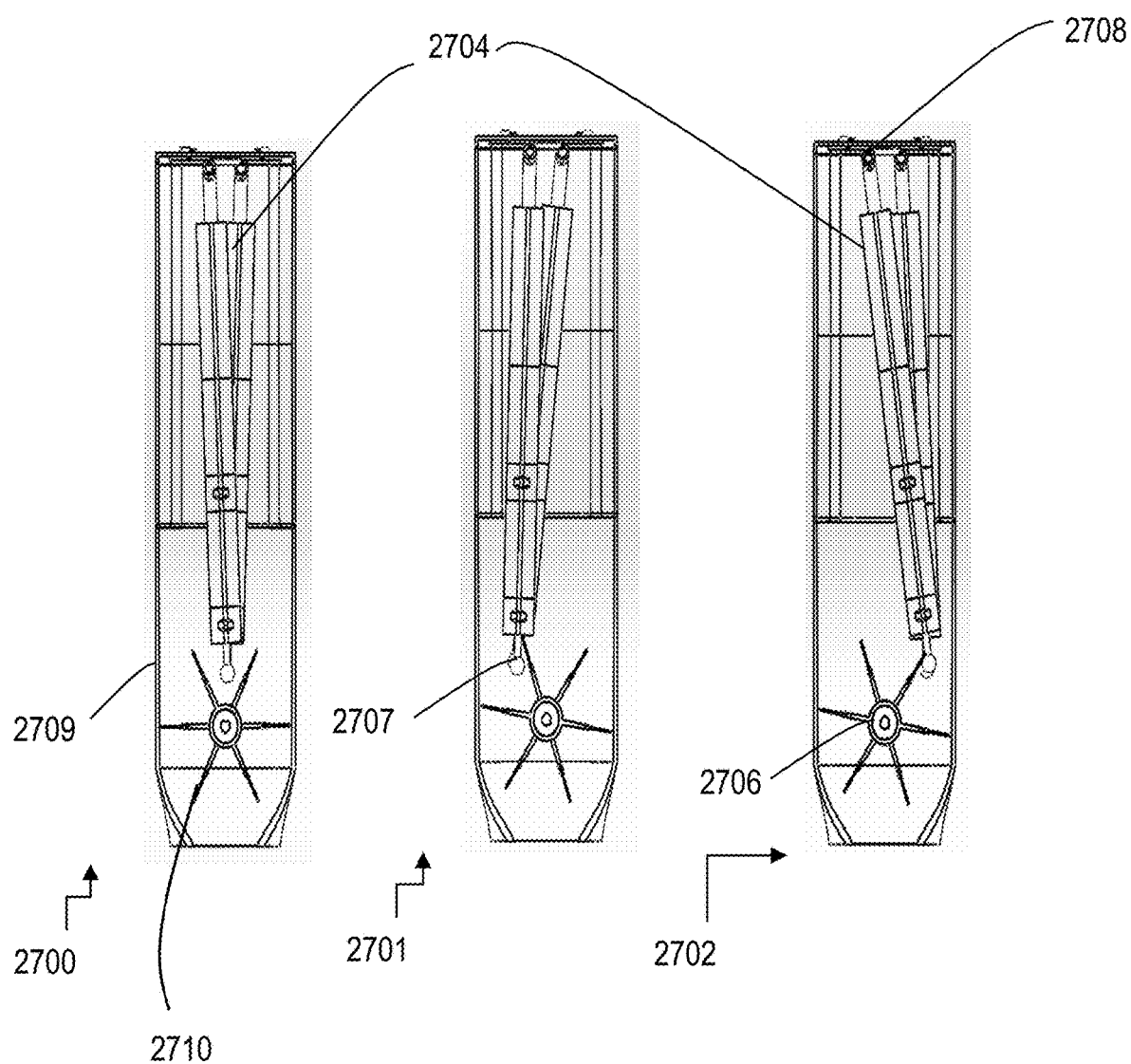
FIG. 27 illustrates an embodiment of this invention, which shows a method to dispense ingredients.

FIG. 27 illustrates an embodiment of this invention, wherein ingredients sticking to the walls of the ingredient container/canister may be reduced by using fittings 2704 within the canister. These fittings may be actuated by motion of the paddles 2710. The fittings 2704 may be attached to the top of canisters 2708 or the sides of canisters 2709. They may have multiple pieces, for example, with one portion fitting bottom 2707 contacting the paddle and another portion fitting top 2704 contacting top of canisters 2708. When the paddle rotates, it may move the fittings back and forth by contacting fitting bottom 2707 and causing motion within the canister which may allow ingredients stuck to the sides of canisters to come unstuck. Snapshot one 2700 illustrates fitting 2704 with no paddles 2710 contact, snapshot two 2701 illustrates fitting 2704 contacting paddles 2710 to one side, snapshot three 2702 illustrates fitting 2704 contacting paddles 2710 to the other side. Several variations of this embodiment may be possible. For example, the shape of the fittings may be different—it could be the shape of a curtain. The fittings may be attached to the sides of the canister instead of the center as shown in FIG. 27. The fittings may include a hinge. Several other variations may be possible.

Figure 28:
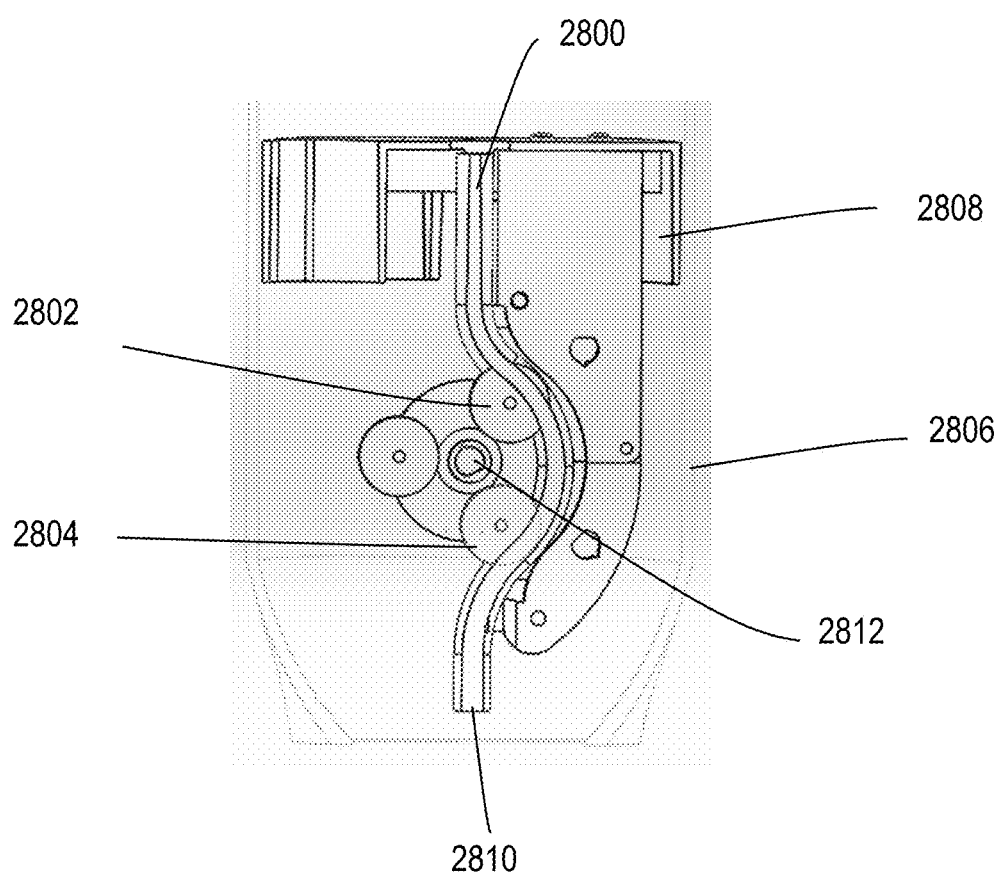
FIG. 28 illustrates an embodiment of this invention, which shows an apparatus for dispensing liquids.

FIG. 28 illustrates an embodiment of this invention, which shows an apparatus for dispensing liquids. The liquid to be dispensed may be stored in a bottle located within a canister 2806 and a flexible tube 2800 may lead from it. The flexible tube may be compressed by rollers such as 2802 and 2804 to control the dispensing of the liquid. A one way valve may be optionally added to the end of the tube 2810 to reduce dripping of liquid in unwanted locations. The rollers 2802 and 2804 may move using rotation of shaft 2812, which in turn may be rotated using a shared dispensing apparatus that may be connected to a pin located on the canister 2806.

References to "one embodiment," "an embodiment," "example embodiment," "various embodiments," etc., may indicate that the embodiment(s) of the invention so described may include a particular feature, structure, or characteristic, but not every embodiment necessarily the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

It will also be appreciated by persons of ordinary skill in the art that the present invention is not limited to what has been particularly shown and described hereinabove. Rather, the scope of the present invention includes both combinations and sub-combinations of the various features described hereinabove as well as modifications and variations which would occur to such skilled persons upon reading the foregoing description. Thus the invention is to only be limited by the claims.

What is claimed is:

1. An automated food making apparatus, comprising:
    a carousel;
    at least one canister configured to seal or unseal a food opening, the at least one canister having a base; and
    a cam mechanism with two stable states, wherein the cam mechanism is configured to rotate along a wall of the at least one canister between a first state of the two stable states having an insulation layer sealing the food opening and a second state of the two stable states having the insulation layer not sealing the food opening.

2. The automated food making apparatus of claim 1, further comprising:
    a shared dispensing apparatus that seals or unseals the food opening by actuating a pin on the canister.

3. The automated food making apparatus of claim 1, further comprising:
    the insulation layer at the base of the at least one canister.

4. The automated food making apparatus of claim 1, further comprising:
    the insulation layer to seal or unseal the food opening.

5. The automated food making apparatus of claim 1, wherein, in the first stable state of the two stable states, the base of the at least one canister is actuated up such that the at least one canister rotates freely on the carousel and does not seal the food opening, and, wherein in the second stable state of the two stable states, the base of the at least one canister is actuated down such that the base of the at least one canister seals the food opening.

6. The automated food making apparatus of claim 5, further comprising a pin rotationally coupled to the cam mechanism with a shaft, the pin configured to rotate the cam mechanism to move the base between the first stable state and the second stable state.

7. The automated food making apparatus of claim 6, further comprising a motor having an actuator arm, wherein the actuator arm engages the pin such that the actuator arm rotates the pin.

8. The automated food making apparatus of claim 6, further comprising a wheel configured to guide rotation of the cam mechanism.

9. An automated food making apparatus comprising:
    a carousel having at least one food opening;
    a plurality of canisters coupled to the carousel, the plurality of canisters comprising:
        at least one ingredient canister configured to store ingredients and to dispense the ingredients from the at least one ingredient canister through the at least one food opening; and
        at least one insulation canister configured to seal the at least one food opening, wherein the at least one insulation canister has a first state that seals the at least one food opening and a second state that unseals the at least one food opening; and
    a motor having an actuator arm, wherein the motor and the actuator arm are configured to dispense the ingredients from the at least one ingredient canister and actuate the at least one insulation canister between the first state and the second state.

10. The automated food making apparatus of claim 9, the at least one insulation canister comprising an insulation layer movable with respect to the at least one insulation canister, wherein the insulation layer engages the at least one food opening in the first state and does not engage the at least one food opening in the second state.

11. The automated food making apparatus of claim 10, the at least on insulation canister comprising a cam, the cam configured to move the insulation layer between the first state and the second state.

12. The automated food making apparatus of claim 11, further comprising a pin rotationally coupled to the cam with a shaft, the pin configured to rotate the cam to move the insulation layer between the first state and the second state.

13. The automated food making apparatus of claim 12, wherein the actuator arm engages the pin such that the actuator arm rotates the pin.

14. The automated food making apparatus of claim 11, further comprising a wheel configured to guide rotation of the cam along a wall of the at least one insulation canister.

15. A method of operating the automated food making apparatus of claim 9, the method comprising:
    rotating the carousel such that the at least one insulation canister is aligned with the food opening; and
    engaging the food opening with an insulation layer of the at least one insulation canister to insulate a chamber within the automated food making apparatus.

16. The method of claim 15, wherein engaging the food opening with the insulation layer comprises rotating, with the motor having the actuator arm, a cam to actuate the insulation layer to seal the at least one food opening, the method further comprising:
    rotating the carousel such that the at least one ingredient canister is aligned with the food opening; and
    dispensing, with the motor and the actuator arm, the ingredients from the at least one ingredient canister through the food opening.

17. The method of claim 15, further comprising:
    disengaging the insulation layer from the food opening; and
    rotating the carousel such that the at least one insulation canister is out of alignment with the at least one food opening.

* * * * *